United States Patent
Shin et al.

(10) Patent No.: US 8,422,670 B2
(45) Date of Patent: Apr. 16, 2013

(54) PASSWORD AUTHENTICATION METHOD

(75) Inventors: Seonghan Shin, Chiyoda-ku (JP);
Kazukuni Kobara, Chiyoda-ku (JP)

(73) Assignee: National Institute of Advanced Industrial Science and Technology, Chiyoda-Ku, Tokyo (JP)

( * ) Notice: Subject to any disclaimer, the term of this patent is extended or adjusted under 35 U.S.C. 154(b) by 150 days.

(21) Appl. No.: 12/987,599

(22) Filed: Jan. 10, 2011

(65) Prior Publication Data

US 2011/0145579 A1  Jun. 16, 2011

Related U.S. Application Data

(63) Continuation of application No. PCT/JP2009/062578, filed on Jul. 10, 2009.

(30) Foreign Application Priority Data

Jul. 10, 2008  (JP) .................. 2008-179670

(51) Int. Cl.
*G06F 7/38* (2006.01)
*H04L 9/34* (2006.01)

(52) U.S. Cl.
USPC ............................ 380/28; 713/169

(58) Field of Classification Search .......... None
See application file for complete search history.

(56) References Cited

U.S. PATENT DOCUMENTS

| | | |
|---|---|---|
| 7,047,408 B1 | 5/2006 | Boyko et al. |
| 2002/0194478 A1 | 12/2002 | MacKenzie |
| 2007/0061572 A1 | 3/2007 | Imai et al. |

FOREIGN PATENT DOCUMENTS

| | | |
|---|---|---|
| JP | 2001-313634 A | 11/2001 |
| JP | 2002-335238 A | 11/2002 |
| JP | 2006-197065 A | 7/2006 |
| JP | 5004086 B2 | 8/2012 |
| JP | 5099771 B2 | 12/2012 |
| WO | 2005/041474 A1 | 5/2005 |

OTHER PUBLICATIONS

Shin et al. Security Proof of AugPAKE. 2008.*
Shin et al. An Authentication and Key Exchange Protocol for Secure Credential Services. ISC 2006, LNCS 4176 pp. 443-458. Springer-Verlag 2006[online].*
"IEEE Standard Specifications for Password-Based Public-Key Cryptographic Techniques", Jan. 29, 2009, IEEE Std 1363.21™ - 2008, IEEE, New York, NY, USA.

(Continued)

*Primary Examiner* — Venkat Perungavoor
(74) *Attorney, Agent, or Firm* — Buchanan Ingersoll & Rooney PC

(57) ABSTRACT

There is provided an authentication method which is secure against various attacks such as a KCI attack on a public network, and can reduce a required calculation amount compared to a conventional method. In this authentication method, a mutual authentication processing technique using Diffie-Hellman type key exchange is modified to compute a master secret Ks in a server by $Ks=g^y$, where y is a random number ($y \in (Z/qZ)^*$) generated by the server. In this method, let $(G, \cdot)$ be a group of order q, g be a generator of that set G, and U, W∈G. "·" is a binary operator on G.

27 Claims, 17 Drawing Sheets

OTHER PUBLICATIONS

"International Standard: Information Technology—Security Techniques—Key Management, Part 4: Mechanisms Based on Weak Secrets", May 1, 2006, 5th edition, ISO/IEC 11770-4, ISO, Geneva, Switzerland.

International Search Report (PCT/ISA/210) issued on Aug. 4, 2009, by Japanese Patent Office as the International Searching Authority for International Application No. PCT/JP2009/062578.

Written Opinion (PCT/ISA/237) issued on Aug. 4, 2009, by Japanese Patent Office as the International Searching Authority for International Application No. PCT/JP2009/062578.

Kwon, "Revision of AMP in IEEE P1363.2 and ISO/IEC 11770-4", Submissions and Research Contributions, IEEE P1363, Jun. 2005.

Office Action from the Japan Patent Office dated Dec. 17, 2012, issued in corresponding Japanese Patent Application No. 2010-519823, with English translation thereof.

Shin et al., "An Efficient Anonymous Password-Authenticated Key Exchange Protocol," IEICE Technical Report, Jul. 14, 2006, vol. 106, No. 176, pp. 107-114, The Institute of Electronics, Information and Communication Engineers.

Shin et al., "On Anonymous Password-Authenticated Key Exchange," IEICE Technical Report, Jul. 12, 2007, Vo. 107, No. 140, pp. 145-151, The Institute of Electronics, Information and Communication Engineers.

* cited by examiner

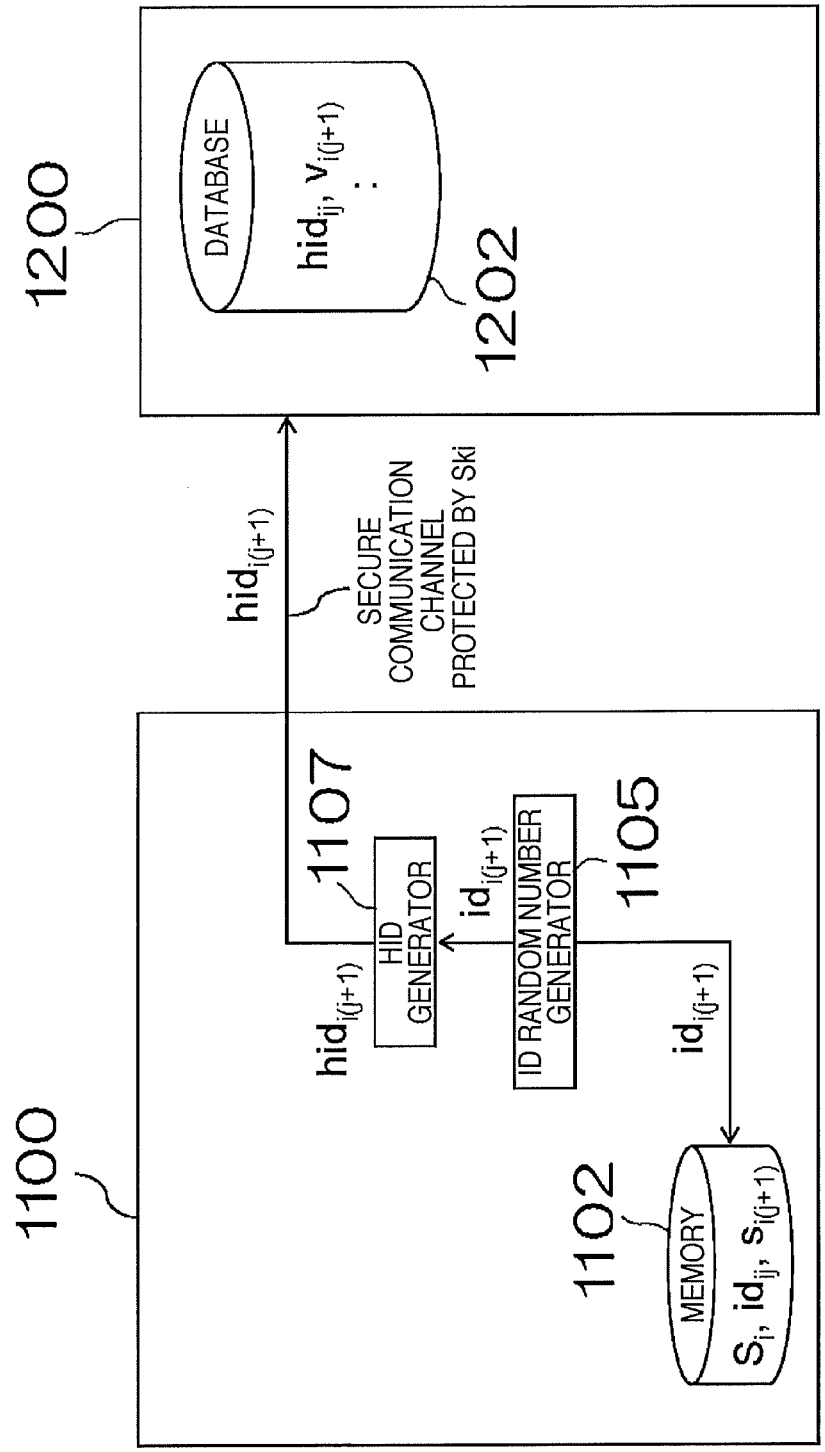

PASSWORD AUTHENTICATION METHOD

TECHNICAL FIELD

The present invention relates to an authentication method using a password and, more particularly, to an authentication method that performs mutual authentication between a client and server using only a password.

BACKGROUND ART

Some authentication methods for performing authentication using only passwords have been proposed so far. These authentication methods include a method that allows a dictionary attack of a password by communication eavesdropping of an attacker. In order to achieve higher security, it is preferable for an authentication method using only a password to have resistances against every kind of attack (for example, communication eavesdropping, replay attack, message alteration, spoofing, and man-in-the-middle attack) on a public network such as the Internet. In order to meet such requirements, an authentication method, which has foundation of security in a discrete logarithm problem, and is secure against not only every kind of attack on the public network but also a KCI (Key Compromise Impersonation) attack in which an attacker spoofs a client using recorded information of a server, is known. However, a problem of a conventional authentication method having such security lies in that both a client and server cannot minimize calculation amounts (the number of modulo exponentiation times). On the client side, since a user terminal is often a compact, slow device, a personal computer of an older generation, a smart card, or a personal digital assistance (PDA), it is desirable to suppress the amount of calculation as much as possible. On the server side, a very large number of users have to be managed, and the calculation capability of the server is often not very high. Hence, it is also desired that the calculation amount is as low as possible.

In a method described in PLT1, mutual authentication is securely done via a data network between two parties who share only a password using Diffie-Hellman key exchange. However, an embodiment shown in FIGS. 2 and 3 of PLT1 is not secure against a KCI attack. An embodiment using a password verifier shown in FIGS. 4 and 5 is secure against a KCI attack, but both a client and server require larger calculation amounts than an authentication method proposed by the present inventors.

A method described in PLT2 is that which improves the calculation efficiency of the method described in FIG. 2 of PLT1, and can at least halve the calculation amount on the client side. However, this method is not secure against a KCI attack. In order to assure security against a KCI attack, the method of PLT2 can be modified like the method described in PLT1 (the embodiment using the password verifier shown in FIGS. 4 and 5), but both a client and server require more calculation amounts than the authentication method proposed by the present inventors.

In a method described in PLT3, a terminal and authentication server share a password and encryption key in advance, the terminal performs authentication by encrypting the password using the encryption key, and sending the encrypted password to the authentication server, and when the authentication has succeeded, the terminal and server exchange an encryption key for a data communication by a conventional method. However, the terminal requires a tamper resistance of a device so as to securely save the encryption key. When the encryption key leaks, the password can be extracted from previously communicated ciphertext. That is, the security is lower than the authentication method proposed by the present inventors.

CITATION LIST

Patent Literatures

PTL1: Japanese Patent Laid-Open No. 2001-313634
PTL2: Japanese Patent Laid-Open No. 2002-335238
PTL3: Japanese Patent Laid-Open No. 2006-197065

Non Patent Literatures

NPL1: "AMP", IEEE P1363-2, Standard specifications for password-based public key cryptographic techniques
NPL2: "KAM-3", ISO/IEC SC27 FCD 11770-4, Information technology—Security techniques—Key management—Part 4: Mechanisms based on weak secrets

SUMMARY OF INVENTION

Technical Problem

The present invention has been achieved to propose an authentication method that is secure against various attacks on the public network as well as a KCI attack, and can reduce a required calculation amount compared to the conventional method.

Solution to Problem

An authentication method of the present invention is that of a mutual authentication processing technique of a type that requires the user to input only a password at the time of execution of authentication processing, and is positioned as an improvement of a mutual authentication processing technique that uses Diffie-Hellman key exchange.

In a Diffie-Hellman key exchange technique, in general, a client computes a value $U=g^u$ based on a random number u ($u \in (Z/qZ)^*$), and sends the computed value to a server. Also, the server computes a value $Y=g^y$ based on a random number y ($y \in (Z/qZ)^*$), and sends the computed value to the client. After that, both the client and server compute a master secret K by:

$$K = g^{uy} \qquad (1)$$

The client and server then generate a session key based on this secret K.

It is conventionally known that the mutual authentication processing technique based on the Diffie-Hellman key exchange is efficient and secure against a KCI attack, as described in NPL1 and NPL2. In the authentication techniques described in these literatures, both a client and server compute a master secret K by:

$$K = g^{y(u+r')} \qquad (2)$$

where
$r' = H_2(C\|S\|U\|Y)$ or $r'=1$;
$U = g^u$;
$Y = U^{y \cdot r'} \cdot W^y$;
$r = H_2(C\|S\|U)$;
$W = g^{H_1(C\|S\|pw)}$;
C: an identifier of a client;
S: an identifier of a server; and
pw: a password that the user remembers.

In these authentication methods, let $(G, \cdot)$ be a group of orders q, g be a generator of that set G, and U, W∈G. Also, "·"

is a binary operator on G. Assuming that $g_1, g_2 \in G$, $g_1 \cdot g_2$ is described as $g_1 g_2$, $g_1 \cdot g_1$ is described as $g_1^2$, and $g_1^i \cdot g_1^j$ is described as $g_1^{i+j}$. Using the password pw and password authentication data W, security against, for example, a KCI attack is assured.

The present inventors found that the security against a KCI attack can be assured even when a calculation formula of a master secret Ks in a server is modified as:

$$Ks = g^y \qquad (3)$$

where y is $(y \in (Z/qZ)^*)$ as a random number generated by the server as in NPL1 and NPL2 described above. As in the above case, in these authentication methods, let $(G, \cdot)$ be a group of orders q, g be a generator of that set G, and U, W∈G. Also, "·" is a binary operator on G. Assuming that $g_1, g_2 \in G$, $g_1 \cdot g_2$ is described as $g_1 g_2$, $g_1 \cdot g_1$ is described as $g_1^2$, and $g_1^i \cdot g_i^j$ is described as $g_1^{i+j}$.

As can be seen from comparison between equations (2) and (3), the need for the modulo exponentiation of (u+r') is obviated from equation (3). This brings a remarkable difference of the calculation amounts of the master secret Ks to be computed by the server. Using equation (3), the calculation amount in the server can be greatly reduced.

Furthermore, since equation (3) does not require u, U, and C as information supplied from a client to compute the master secret Ks, the master secret Ks can be computed in advance. Before the client to be authenticated establishes a connection to the server, the master secret Ks can be computed in advance. Therefore, the calculation amount of the server after the client establishes the connection can be small, and the authentication processing can be completed within a short period of time.

In the conventional authentication method based on the Diffie-Hellman key exchange technique, it is considered that power computations associated with u are indispensable so as to assure security. By contrast, the present inventor has invented an authentication method which can assure security even when power computations associated with u are excluded. Based on the present invention, the authentication processing which is secure against, for example, a KCI attack can be implemented by a smaller calculation amount than the conventional method, and the processing can be completed within a shorter period of time than the conventional method.

Advantageous Effects of Invention

According to the present invention, when the server-side master secret Ks is computed by equation (3), a value Y, which is returned by the server in response to reception of a value U from the client, is computed by:

$$Y = U^y \cdot W^{y \cdot r} \qquad (4)$$

or $$Y = U^{y \cdot r} \cdot W^Y \qquad (4')$$

where r is a value computed to have U (or U and another information) as an input to a function $H_2(\ )$, and can be computed in the same manner as in, for example, the method of NPL1 as:

$$r = H_2(C \| S \| U)$$

where C is an identifier of the client, and S is an identifier of the server. W is password authentication data (password verifier) stored in a storage device of the server in correspondence with the client identifier C, and can be similarly computed, for example, by:

$$W = g^{H_1(C \| S \| pw)}$$

W is computed in advance, and can be stored in the storage device of the server.

A master secret Kc in the client can be computed by:

$$K_c = Y^{(1/b \bmod q)} \qquad (5)$$

for $$b = u + PW \times r \bmod q \text{ (when } Y = U^y \cdot W^{y \cdot r}) \qquad (6)$$

or $$b = u \times r + PW \bmod q \text{ (when } Y = U^{y \cdot r} \cdot W^{y \cdot r}) \qquad (6')$$

where PW is a value computed by inputting the password pw (or pw and another information) input by the user to the function $H_1(\ )$ and can be computed, for example, by:

$$PW = H_1(C \| S \| pw)$$

Note that pw is the same password as that used as a foundation of the W computation. Also, r is a value computed by inputting U (or U and another information) to the function $H_1(\ )$, as in the above description associated with equation (4), and can be computed, for example, by:

$$r = H_2(C \| S \| U)$$

Of the aforementioned calculation formulas of Y and b, equations (4') and (6') are included in NPL1 and NPL2, but equations (4) and (6) are established according to the invention of the present inventor.

The calculation amount of the client-side master secret Kc, which is given by equation (5), is the same as that of the methods according to NPL1 and NPL2 having the smallest calculation amounts in the conventionally known mutual authentication technique based on the Diffie-Hellman key exchange. Therefore, the authentication processing technique disclosed in the present specification is a method having a very small calculation amount not only for the server but also for the client.

The reason why the security against a KCI attack can be assured while reducing the calculation amount associated with the master secret, as given by equation (3), will be described below. Equation (4) will be described first. Assume that an attacker acquires the password authentication data W stored in the storage device of the server. A KCI attack is that which is made by the attacker who acquired the authentication information of the server and spoofs the client without making any dictionary attack of the password. When this attack will be generally described, the attacker sends, to the server, U computed as follows:

$$U = g^c \cdot g^{PW \cdot d}$$

where c and d are random numbers (c, d∈$(Z/qZ)^*$) generated by the attacker. Also, $W = g^{PW}$, and $PW = H_1(C \| S \| pw)$. The server which received this U returns Y computed as follows:

$$Y = U^y \cdot W^{y \cdot r}$$

In order to make a KCI attack success, the attacker has to retrieve a which yields $Y^a = K$. That is, the attacker has to solve:

$$(c + PW \times d + PW \times r) y \times a = y \bmod q$$

The above equation can be simplified like:

$$(c + PW(d + r))a = 1 \bmod q$$

The solutions of the above equation are:

$$c \times a = 1 \text{ and } (d+r)a = 0$$

In this case, since the attacker makes a KCI attack without the dictionary attack, a term associated with PW has to assume zero. Since c×a=1, and a≠zero, (d+r)a=0 has to result in d+r=0. In short, the attacker has to use a value [−r mod q] as d upon computing U. However, since r is a hashed value (of a one-way function) decided by U, the attacker cannot compute d. In other words, the attacker cannot make a KCI attack. The same applies to equation (4'), but a description thereof will not be given.

According to the present invention, the load on a CPU associated with the authentication processing can be reduced, and it is especially effective for a terminal having a low processing capability and a server which is required to process a large number of requests from clients. Also, since the server can compute the master secret in advance, as described above, the processing upon reception of an authentication request from a client can be completed within a very short period of time. The present invention can be widely used for users, and services and applications that require server authentication. For example, the present invention can be used in login processing to a server and network and also in electronic commerce.

The present invention is applicable to not only an authentication method using only a password, but also an authentication method to which another authentication technique is added. For example, the present invention is applicable to a two-factor authentication method. The two-factor authentication method as an application of the present invention is suited as an authentication method in a ubiquitous environment, when a user terminal does not include, for example, a tamper resistant module. When a user terminal uses a tamper resistant module, the two-factor authentication method can be used in Internet banking that requires higher security.

Some preferred embodiments based on the proposals of the present inventors are specified in the scope of the appended claims. However, such embodiments are not limited to the scope of the claims and those explicitly described in this specification and the drawings, and various modes can be presented without departing from the scope of the invention disclosed in the specification. The scope of embodiments of the inventions disclosed in the specification includes every novel and useful arrangements and their combinations, which can be taught from these documents independently of whether or not the embodiments are explicitly disclosed in the scope of the claims, the specification, and the drawings.

BRIEF DESCRIPTION OF THE DRAWINGS

FIG. 17 is a diagram for explaining processing after completion of the j-th protocol in the fourth embodiment.

DESCRIPTION OF EMBODIMENTS

Figure 1:
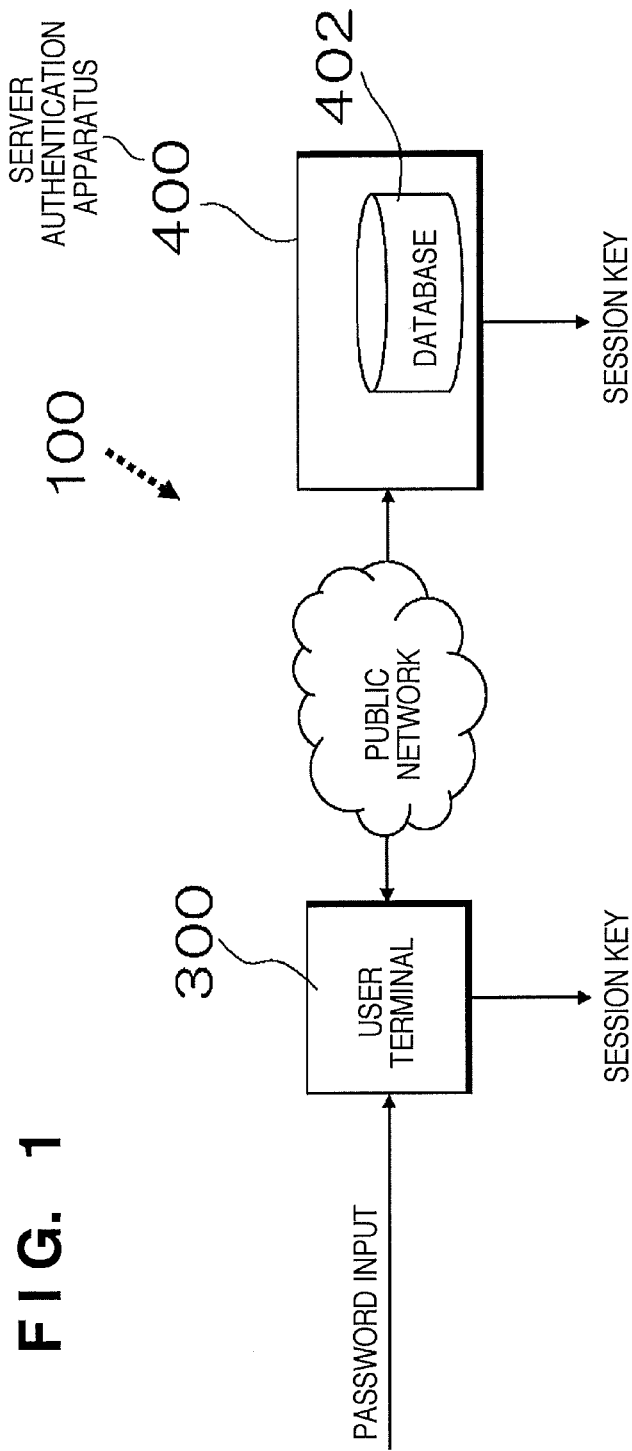
FIG. 1 is a diagram for explaining an overview of the first embodiment.

Embodiments of the present invention include the following mutual authentication method between a client and server. In this method, processing executed by the server includes:

(a) a step of computing, based on a random number y (y∈(Z/qZ)*) generated by the server, a server-side master secret Ks by:

$$Ks = g^y \quad (7)$$

(b) a step of receiving first client information U computed by the client from the client together with a first identifier (C, WID, id);

(c) a step of computing, using the received first client information U and first identifier, first server information Y by:

$$Y = U^y \cdot W^{y \cdot r} \quad (8)$$

or $$Y = U^{y \cdot r} \cdot W^y \quad (8')$$

(d) a step of sending the computed first server information Y to the client;

(e) a step of authenticating client authentication information Vc received from the client using the server-side master secret Ks; and (f) a step of generating server authentication information Vs using the server-side master secret Ks, and sending the Vs to the client, where q is an order of a group (G,·), g is a generator of that set G, and "·" is a binary operator on G, symbol W in equations (8) and (8') represents a part which includes information associated with a password pw, and can be obtained, based on password information v generated by the client, by:

$$W = g^v \quad (9)$$

or based on the password information v generated by the client and a committed value T of a random number t generated by the client, by:

$$W = T^v = g^{t \times v} \quad (9')$$

the password information v is a value computed based on an output of a function $H_1(\ )$ which has at least the password pw as an input, × is a multiplication on integers, symbol r in equations (8) and (8') represents a value which is unknown at a time before the client computes the first client information U and a value which can be computed by both the server and client, and U, W, Y, T, g∈G, and processing executed by the client includes:

(a') a step of computing the first client information U by $U=g^u$ based on a random number u (u∈(Z/qZ)*) generated by the client;

(b') a step of sending the computed first client information U to the server together with the first identifier;

(c') a step of receiving the first server information Y in response to sending of the first client information U;

(d') a step of, when $W=g^v$ (9) above, computing, based on the aforementioned password information v and value r, a blinded value b using:

$$b = u + v \times r \bmod q \text{ (when } Y = U^{p'} \cdot W^{p' \cdot r})\tag{10}$$

or $$b = u \times r + v \bmod q \text{ (when } Y = U^{p'} \cdot W^{p' \cdot r})\tag{10'}$$

or a step of, when $W=T^v=g^{t \times v}$ (9') above, computing, based on the password information v generated by the client and the random number t generated by the client, the blinded value b using:

$$b = u + t \times v \times r \bmod q \text{ (when } Y = U^{p'} \cdot W^{p' \cdot r})\tag{11}$$

or $$b = u \times r + t \times v \bmod q \text{ (when } Y = U^{p'} \cdot W^{p' \cdot r})\tag{11'}$$

(e') a step of computing, based on the received first server information Y, a client-side master secret $K_c$ by:

$$K_c = Y^{(1/b \bmod q)}$$

(f') a step of generating client authentication information Vc using the client-side master secret $K_c$, and sending Vc to the server; and (g') a step of authenticating the server authentication information Vs received from the server using the client-side master secret $K_c$, where [1/b mod q] indicates an integer a which satisfies [a×b≡1 mod q] and is equal to or larger than 1 and is less than q.

According to the embodiments, the value r can be a value which can be computed from the random number sent from the server to the client after the first client information U is sent from the client, or from an output obtained by using at least the first client information U as an input to a one-way function $F_2( )$.

According to the embodiments, the password information v can be a value which can be computed from an output of a one-way function $F_1( )$ having at least the password pw as an input.

According to the embodiments, the password information v can be a value obtained by combining at least an output of a function $H_1( )$ or one-way function $F_1( )$ at least having the password pw as an input and a random number s, or a value obtained by combining at least the password pw and the random number s.

According to the embodiments, the password information v can be described as:

$$v = s + hpw \bmod q, \text{ or}$$

$$v = s \times hpw \bmod q, \text{ or}$$

$$v = s(+)hpw, \text{ or}$$

a value which can be computed from an output of a function $H_1( )$ or one-way function $F_1( )$ having at least the password pw and the random number s as inputs, where hpw is a value which can be computed from an output of the function $H_1( )$ or one-way function $F_1( )$ having at least the password pw as an input, and (+) is an exclusive OR.

According to the embodiments, the part W or the password information v is stored in advance in a storage device of the server in association with the first identifier (C, WID), and the method can have a step of causing the server to search the storage device based on the received first identifier to retrieve the part W (when the part W is stored) or the password information v (when the password information v is stored).

According to the embodiments, the part W or the password information v is stored in a storage device of the server in association with a second identifier which is computed from an output of a one-way function $H_3( )$ which includes at least the first identifier (C, WID) as an input, and the method can have a step of causing the server to search the storage device based on the second identifier computed from the output of the one-way function $H_3( )$ which includes at least the received first identifier (C, WID) as an input to retrieve the part W (when the part W is stored) or the password information v (when the password information v is stored).

According to the embodiments, the client has a client-side alteration detector generation key and a client-side alteration detector verification key, the server has, together with the first identifier or the second identifier, a server-side alteration detector verification key required to verify an alteration detector generated based on the client-side alteration detector generation key, and a server-side alteration detector generation key which can generate an alteration detector that can be verified by the client-side alteration detector verification key, and the method can have:

(a) a step of causing the client to generate an alteration detector mac1 using the client-side alteration detector generation key at least for the U (or the U and a random number received from the server), and to send the alteration detector mac1 to the server;

(b) a step of causing the server to verify the alteration detector mac1 received from the client using the server-side alteration detector verification key, and to interrupt, when the verification of the alteration detector mac1 has failed, client-server mutual authentication;

(c) a step of causing the server to verify the alteration detector mac1 received from the client using the server-side alteration detector verification key, to record, when the verification of the alteration detector mac1 has succeeded, a set of at least the U and Y in a log list Ps', to generate an alteration detector mac2 using the server-side alteration detector generation key at least for the U and Y, and to send the alteration detector mac2 to the client;

(d) a step of causing the client to interrupt, when the verification of the alteration detector mac2 sent from the server has failed, client-server mutual authentication without sending the client authentication information Vc;

(e) a step of causing the client to generate, when the verification of the alteration detector mac2 sent from the server has succeeded, an alteration detector mac3 using the client-side alteration detector generation key at least for the Y and the client authentication information Vc, to send the alteration detector to the server, and to record a set of at least the U and Y in a log list Pc;

(f) a step of causing the server to interrupt, when the verification of the alteration detector mac3 sent from the client has failed, client-server mutual authentication;

(g) a step of causing the server to record, when the verification of the alteration detector mac3 sent from the client has succeeded, and when the verification of the client authentication information Vc sent from the client has failed, a set of at least the U and Y in a log list Ps, and to interrupt client-server mutual authentication; and (h) a step of comparing, when the client-server mutual authentication is normally terminated, the sets of at least the U and Y in the log lists Ps, Pc, and Ps', which are kept recorded by the server and the client during the client-server mutual authentication processing after the previous client-server mutual authentication step is normally terminated, by a method which is never altered by a third party.

In this embodiment, the remaining number of entries obtained by excluding entries of the sets of U and Y in Pc that match those in Ps' can be considered as the number of online exhaustive searches from the server side, and the remaining number of entries obtained by excluding entries of the sets of U and Y in Ps that match those in Pc can be considered as the number of online exhaustive searches from the client side. Thus, an online exhaustive search detection function of a password using alteration detection can be provided.

According to the embodiments, the alteration detector generation key and detector verification key of at least one of the server side and client side can be MAC (Message Authentication Code) keys.

According to the embodiments, the alteration detector generation key and detector verification key of both the server side and client side can be MAC (Message Authentication Code) keys. In this case, all of
the server-side alteration detector generation key,
the server-side alteration detector verification key,
the client-side alteration detector generation key, and
the client-side alteration detector verification key are identical keys, and
the client and server are configured to use different MAC generation algorithms or different message formats so as to be able to generate different alteration detectors even when they use identical MAC keys.

According to the embodiments, the alteration detector generation key can be used as a digital signature generation key, and the detector verification key can be used as a digital signature verification key.

According to the embodiments, the client has a client-side data key cdk, the server has a server-side data key sdk together with the first identifier or second identifier, and the method can have, when a client-server mutual authentication step is normally terminated:

(a) a step of causing the server to send, to the client, the server-side data key sdk, which is encrypted using an encryption key generated depending on the server-side master secret Ks generated in that client-server mutual authentication step;

(b) a step of causing the client to decrypt the encrypted data key sdk sent from the server using an encryption key generated depending on the client-side master secret Kc generated in that client-server mutual authentication step; and (c) a step of causing the client to restore data key dk from the client-side data key cdk and the server-side data key sdk.

According to the embodiments, the client has a client-side data key cdk, the server has a server-side data key sdk together with the first identifier or second identifier, and the method can have, when a client-server mutual authentication step is normally terminated:

(a') a step of causing the client to send, to the server, the client-side data key cdk, which is encrypted using an encryption key generated depending on the client-side master secret Kc generated in that client-server mutual authentication step;

(b') a step of causing the server to decrypt the encrypted data key cdk sent from the client using an encryption key generated depending on the server-side master secret Ks generated in that client-server mutual authentication step; and (c') a step of causing the server to restore data key dk from the client-side data key cdk and the server-side data key sdk.

According to the embodiments, the data key dk is given by:

$$dk'=cdk(+)sdk, \text{ or}$$

$$dk'=cdk+sdk \bmod q, \text{ or}$$

$$dk'=cdk \times sdk \bmod q,$$

and can be restored by:

$$dk=dk', \text{ or}$$

$$dk=(dk')(+)hpw, \text{ or}$$

$$dk=(dk')+hpw \bmod q, \text{ or}$$

$$dk=(dk') \times hpw \bmod q, \text{ or}$$

a value computed from an output of a function $H_3()$ having at least dk' and hpw as inputs, where (dk') indicates a step of computing a value dk' for the first time, hpw is a value which can be computed from an output of a function $H_1()$ or one-way function $F_1()$ having at least the password pw as an input, and (+) is an exclusive OR.

According to the embodiments, the client saves one or both of the random number t and the first identifier as pieces of information which are likely to be used by the client to attain the client-server mutual authentication in advance in a recording device of the client, and when the client executes the client-server mutual authentication, it can read out them in response to a request of the client-server mutual authentication.

According to the embodiments, the method can have a step of updating, when the client-server mutual authentication has succeeded,
all or some of the first identifier, the part W or the password information v, and a committed value T of a random number t generated by the client, as pieces of information which are used in that mutual authentication and are recorded in the storage device of the server, and
both or one of the random number t and the first identifier, as pieces of information recorded in the storage device of the client,
using values exchanged between the client and server, or the master secrets Kc (client side) and Ks (server side) shared in that authentication step, or both the master secrets and the values exchanged between the server and client.

According to the embodiments, the password information v can be computed, based on the password pw and random number s, by:

$$[v=s+hpw \bmod q] \text{ or } [v=s \times hpw \bmod q]$$

in the step of updating, the server can update the part W to W' to be described as:

$$[W'=W \cdot g^{ud}] \text{ or } [W'=W^{ud}]$$

and, the client can update the random number s to s' to be described as:

$$[s'=s+ud \bmod q] \text{ or } [s'=s \times ud \bmod q]$$

According to the embodiments, the password information v can be computed, based on the password pw and random number s, by:

$$[v=s+hpw \bmod q]$$

in the step of updating, the server can update the password information v to v' to be described as:

$$[v'=v+ud \bmod q]$$

and, the client can update the random number s to s' to be described as:

$$[s'=s+ud \bmod q]$$

According to the embodiments, the password information v can be computed, based on the password pw and random number s, by:

$$v=s(+)hpw$$

in the step of updating, the server can update the password information v to v' to be described as:

$$v'=v(+)ud$$

and, the client can update the random number s to s' to be described as:

$$s'=s(+)ud$$

According to the embodiments, the password information v can be computed, based on the password pw and random number s, by:

$$v=s \times hpw \bmod q$$

in the step of updating, the server can update the password information v to v' to be described as:

$$v'=v \times ud \bmod q$$

and, the client can update the random number s to s' to be described as:

$$s'=s \times ud \bmod q$$

Note that in the above description, hpw is an output of a function $H_1(\ )$ or one-way function $F_1(\ )$ having at least the password pw as an input, and ud is a value generated from the master secrets Ks (server side) and Kc (client side) shared by the server and client.

According to the embodiments, the method has a step of updating, when the client-server mutual authentication has succeeded, both or one of the server-side alteration detector generation key and server-side alteration detector verification key as pieces of information which are used in that mutual authentication and are recorded in the storage device of the server, and both or one of the client-side alteration detector generation key and client-side alteration detector verification key as pieces of information recorded in the storage device of the client, using values exchanged between the client and server, or the master secrets Kc (client side) and Ks (server side) shared by that authentication processing, or both the master secrets and the values exchanged between the server and client, and a step of, when the server and client use the same MAC key MacK, causing the server and client to respectively update the MAC key MacK to MacK' can be described as:

$$MacK'=MacK(+)ud, \text{ or}$$

$$MacK'=MacK+ud \bmod q, \text{ or}$$

$$MacK'=MacK \times ud \bmod q$$

where ud is a value generated from the master secret Ks (server side) and Kc (client side) shared by the server and client.

According to the embodiments, the method has a step of updating, when the client-server mutual authentication has succeeded, the server-side data key sdk as information which is used in that mutual authentication and is recorded in the storage device of the server, and the client-side data key cdk as information recorded in the storage device of the client using values exchanged between the client and server, or the master secrets Kc (client side) and Ks (server side) shared in that authentication processing, or both the master secrets and the values exchanged between the server and client, and a step of, when the client has the client-side data key cdk and the server has the server-side data key sdk, causing the server and client to respectively update cdk and sdk to cdk' and sdk' can be described, when the dk' can be described as $$dk'=cdk(+)sdk$$

by $$cdk'=cdk(+)ud$$

$$sdk'=sdk(+)ud,$$

when the dk' can be described as $$dk'=cdk+sdk \bmod q$$

by $$cdk'=cdk+ud \bmod q$$

$$sdk'=sdk-ud \bmod q$$

or $$cdk'=cdk-ud \bmod q$$

$$sdk'=sdk+ud \bmod q,$$

or when the dk' can be described as $$dk'=cdk \times sdk \bmod q$$

by $$cdk'=cdk \times ud \bmod q$$

$$sdk'=sdk/ud \bmod q$$

or $$cdk'=cdk/ud \bmod q$$

$$sdk'=sdk \times ud \bmod q$$

where ud is a value generated from the master secrets Ks (server side) and Kc (client side) shared by the server and client, − is a subtraction on integers, and [a=c/b mod q] indicates an integer a which is equal to or larger than 1 and is less than q, and satisfies [a×b≡c mod q] when c≠0.

The embodiments of the present invention include a system which is configured by a client and server, and is configured so that the client and server execute the aforementioned mutual authentication method.

The embodiments of the present invention include a computer which is configured to carry out the processing to be executed on the client side in the aforementioned mutual authentication method.

The embodiments of the present invention include a computer which is configured to carry out the processing to be executed on the server side in the aforementioned mutual authentication method.

The embodiments of the present invention include a computer program which is executed by a CPU of a computer to control the computer to carry out the processing to be executed on the client side in the aforementioned mutual authentication method.

The embodiments of the present invention include a computer program which is executed by a CPU of a computer to control the computer to carry out the processing to be executed on the server side in the aforementioned mutual authentication method.

In order to help understanding of the present invention, some other embodiments of the present invention will be explained below. However, these embodiments will not be explained with the intention to limit the scope of the claims of the present invention, but will be explained only to promote better understanding of the present invention.

Prior to the description of embodiments of an authentication system using only a password and its applied system, background information and symbols used in the following description will be explained first.

In the following method, let (G,·) be a group of orders q, g be a generator of that set G, and U, W∈G. Also, "·" is a binary operator on G. Assuming that $g_1$, $g_2$∈G, $g_1 \cdot g_2$ is described as $g_1 g_2$, $g_1 \cdot g_1$ is described as $g_1^2$, and is described as $g_1^{i+j}$. Since the present invention can be practiced using various groups, discrete logarithm problems of which are hardly solved, it should be noted that the present invention is not limited to prime field groups and certain elliptic curve groups in the following description and the scope of the claims.

Let k be a security parameter of a hash function H. However, assume that $\frac{1}{2^k}$ is negligibly small. $\{0, 1\}^*$ expresses a set of finite binary number strings, and $\{0, 1\}^k$ expresses a set of binary number strings having a length k. The hash function H is a secure one-way function, which inputs $\{0, 1\}^*$, and outputs $\{0, 1\}^k$, and FDH (Full-Domain Hash) functions $H_1$ and $H_2$ are secure one-way functions, which input $\{0, 1\}^*$ and output $(Z/qZ)^*$, where $(Z/qZ)^*$ represents a set (subgroup) of $\{1, 2, \ldots, q\}$. As a random number generated by a random number generator, R∈$(Z/qZ)^*$ is randomly generated. Also, ∥ means to concatenate values. Furthermore, C and S (or $S_i$) are IDs which respectively express a user and server (or an i-th server of a large number of servers).

First Embodiment

Authentication System Using Only Password

FIG. 1 is a diagram for explaining the overall arrangement of an authentication system 100 which performs authentication using only a password, as will be described below as the first embodiment. The authentication system 100 is configured by a user terminal 300 and server authentication apparatus 400. The user terminal 300 makes certain characteristic operations based on a password input by the user. The server authentication apparatus 400 holds user IDs and password authentication data in its database 402. In the authentication system 100, the user terminal 300 and server authentication apparatus 400 mutually authenticate with each other via a public network such as the Internet, and only when the mutual authentication has succeeded, they assure the same session key. The shared session key is used to protect communication contents which are made by the user terminal 300 and server authentication apparatus 400 later.

Note that respective functional elements depicted in all the following figures can be implemented by dedicated hardware, but they can also be implemented by software processing using a CPU and computer programs. Therefore, in all the following figures, even when terms "device" and "apparatus" like "random number generating device (or generator)" are used, their implementations are not limited to hardware, but they can be implemented by means of software processing. Also, two or more functional elements can be combined into a single hardware circuit, or a single program can include two or more functional elements as sub-programs. For example, all or some functions of the user terminal and server authentication apparatus to be introduced in the following embodiments can be implemented using a processor, memory, and program codes. Also, respective functional elements can also be implemented using a programmable circuit such as an FPGA. For those who are skilled in the art, appropriate implementation can be selected according to practical requirements of embodiments.

[1. Initialization of Authentication System 100 Using Only Password]

Initialization processing in the authentication system 100 will be described below with reference to FIG. 2. In this initialization processing, the user terminal 300 executes initialization processing using a secure communication channel (for example, direct registration, mailing, or information using a telephone) with the server authentication apparatus 400 based on a password input by the user, and the server authentication apparatus 400 saves a user ID and password authentication data in its internal memory or the database 402.

<Process in User terminal 300>

Figure 2:
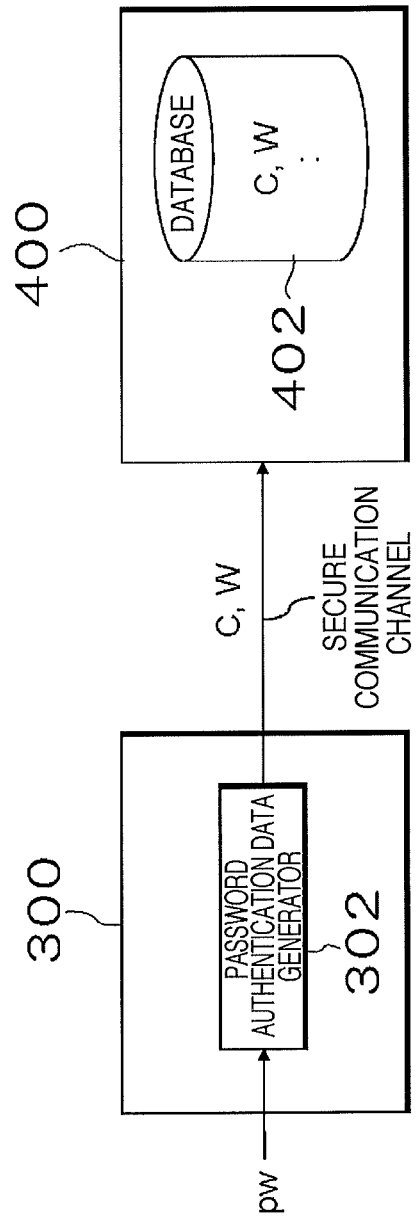
FIG. 2 is a block diagram for explaining an initialization stage in the first embodiment.

As shown in FIG. 2, the user terminal 300 includes a password authentication data generator 302. In the initialization processing in the terminal 300, the password authentication data generator 302 computes and outputs password authentication data W to have a password pw input by the user as an input using:

$$W = g^{H1(C\|S\|pw)}$$

After that, the terminal 300 sends a user ID and the password authentication data [C, W] to the server authentication apparatus 400.

<Process in Server Authentication Apparatus 400>

As shown in FIG. 2, in the initialization processing in the server authentication apparatus 400, the authentication apparatus 400 stores the user ID and password authentication data [C, W] received from the user terminal 300 in its internal memory or the database 402 in the authentication apparatus 400.

[2. Protocol Execution of Authentication System 100 Using Only Password]

Protocol execution processing in the authentication system 100 using only a password will be described below with reference to FIGS. 3 and 4. This protocol execution processing is executed after completion of the initialization processing described using FIG. 2. In the protocol execution processing, the user terminal 300 makes certain characteristic operations based on a password input by the user, and mutually authenticates with the server authentication apparatus 400 via a public network such as the Internet. As described above, the server authentication apparatus 400 holds user IDs and password authentication data in, for example, the database 402. Only when the mutual authentication has succeeded, the user terminal 300 and server authentication apparatus 400 assure the same session key.

<Operation of User Terminal 300>

Figure 3:
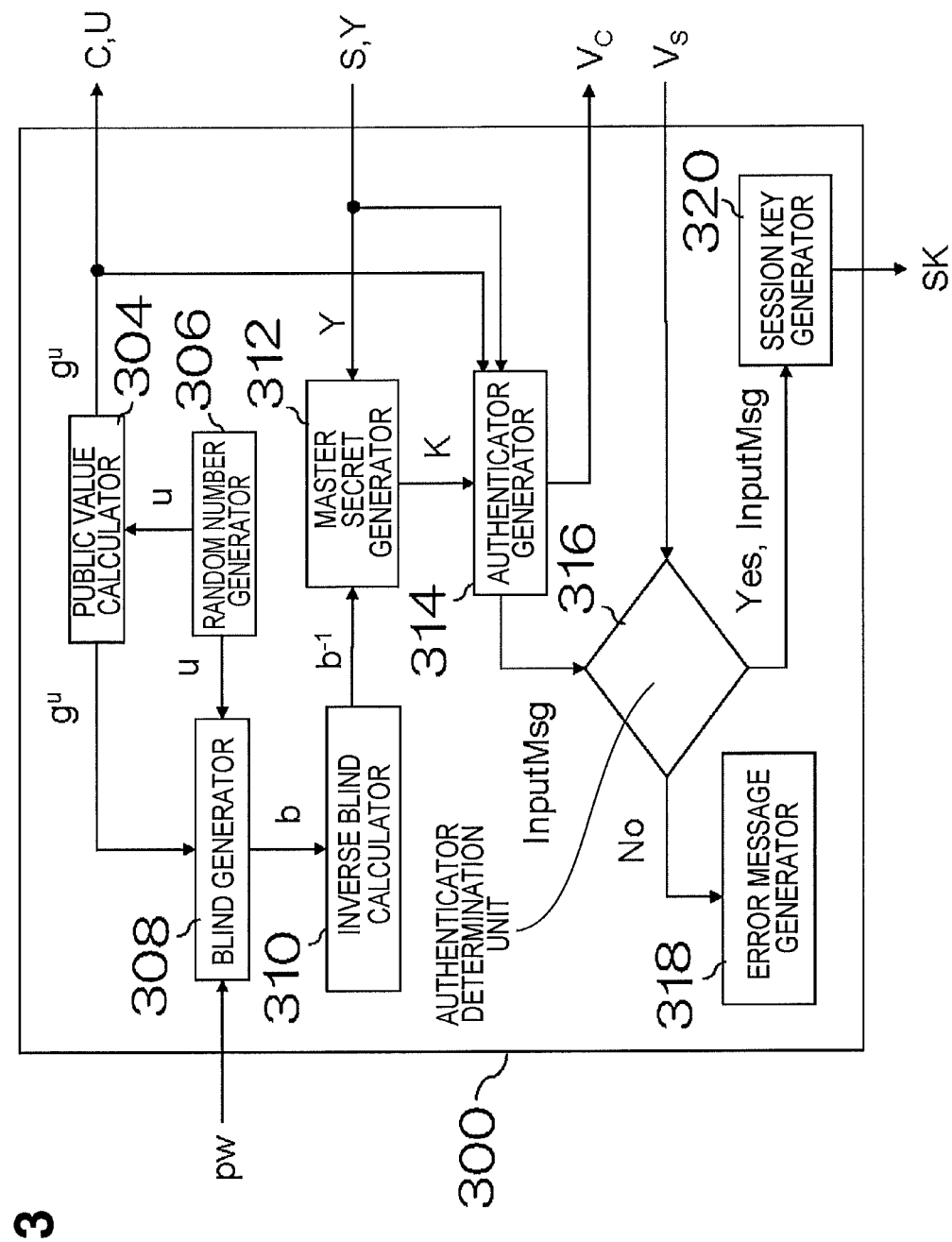
FIG. 3 is a block diagram for explaining the arrangement and functions of a client according to the first embodiment.

FIG. 3 is a block diagram for explaining the functional arrangement and operation of the user terminal 300, which implements the protocol execution processing of the authentication system 100. The protocol execution processing of the authentication system 100 in the terminal 300 will be described first with reference to FIG. 3.

A public value calculator 304 computes and outputs a public value U to have, as an input, a random number u (u∈(Z/qZ)*) which is randomly generated by a random number generator 306, using:

$$U=g^u$$

A blind generator 308 computes and outputs a blind b to have, as inputs, a password pw input by the user, the random number u randomly generated by the random number generator 306, and the public value U output from the public value calculator 304, using:

$$b=u+H_1(C\|S\|pw)\times r \bmod q$$

for r=H$_2$(C∥S∥U)

An inverse blind calculator 310 computes and outputs an inverse blind b$^{-1}$ to have the blind b output from the blind generator 308 as an input using:

$$b^{-1} \bmod q$$

The user terminal 300 sends C as a user ID and the public value U output from the public value calculator 304 to the server authentication apparatus 400 via a communication processor (not shown).

After a short time, the user terminal 300 receives a message [S, Y] from the server authentication apparatus 400. A master secret generator 312 computes and outputs a master secret K to have, as inputs, a value Y received from the server authentication apparatus 400, and the inverse blind b$^{-1}$ output from the inverse blind calculator 310, using:

$$K=Y^{(1/b \bmod q)}$$

Then, an authenticator generator 314 computes an authenticator Vc to have, as inputs, the public value U output from the public value calculator 304, the value Y received from the server authentication apparatus 400, and the master secret K output from the master secret generator 312, using:

$$Vc=H(1\|C\|S\|U\|Y\|K)$$

and outputs it together with an input message InputMsg. Note that the input message is described as:

$$InputMsg=C\|S\|U\|Y\|K$$

In this case, a MAC (Message Authentication Code) may be used in place of the hash function H. The user terminal 300 sends the authenticator Vc output from the authenticator generator 314 to the server authentication apparatus 400 via a communication processor (not shown).

After a short time, the user terminal 300 receives a message [Vs] from the server authentication apparatus 400. An authenticator determination unit 316 confirms if the authenticator Vs received from the server authentication apparatus 400 is a correctly generated value. The authenticator determination unit 316 computes a hash function H(2∥InputMsg) based on the input message InputMsg input from the authenticator generator 314, and compares the result with the authenticator Vs received from the server authentication apparatus 400. In the determination processing of the authenticator determination unit 316, when the authenticator Vs does not match the hash function H(2∥InputMsg), the authenticator determination unit 316 notifies an error message generator 318 of the mismatch. In response to this notification, the error message generator 318 generates an error message, and interrupts the processing. On the other hand, when the authenticator determination unit 316 determines that the authenticator Vs matches the hash function H(2∥InputMsg), it authenticates the server authentication apparatus 400 as an authentic apparatus, and notifies a session key generator 320 of that message. The session key generator 320 computes and outputs a session key SK to have the message InputMsg supplied from the authenticator generator 314 as an input, using:

$$SK=H(3\|InputMsg)$$

<Operation of Server Authentication Apparatus 400>

Figure 4:
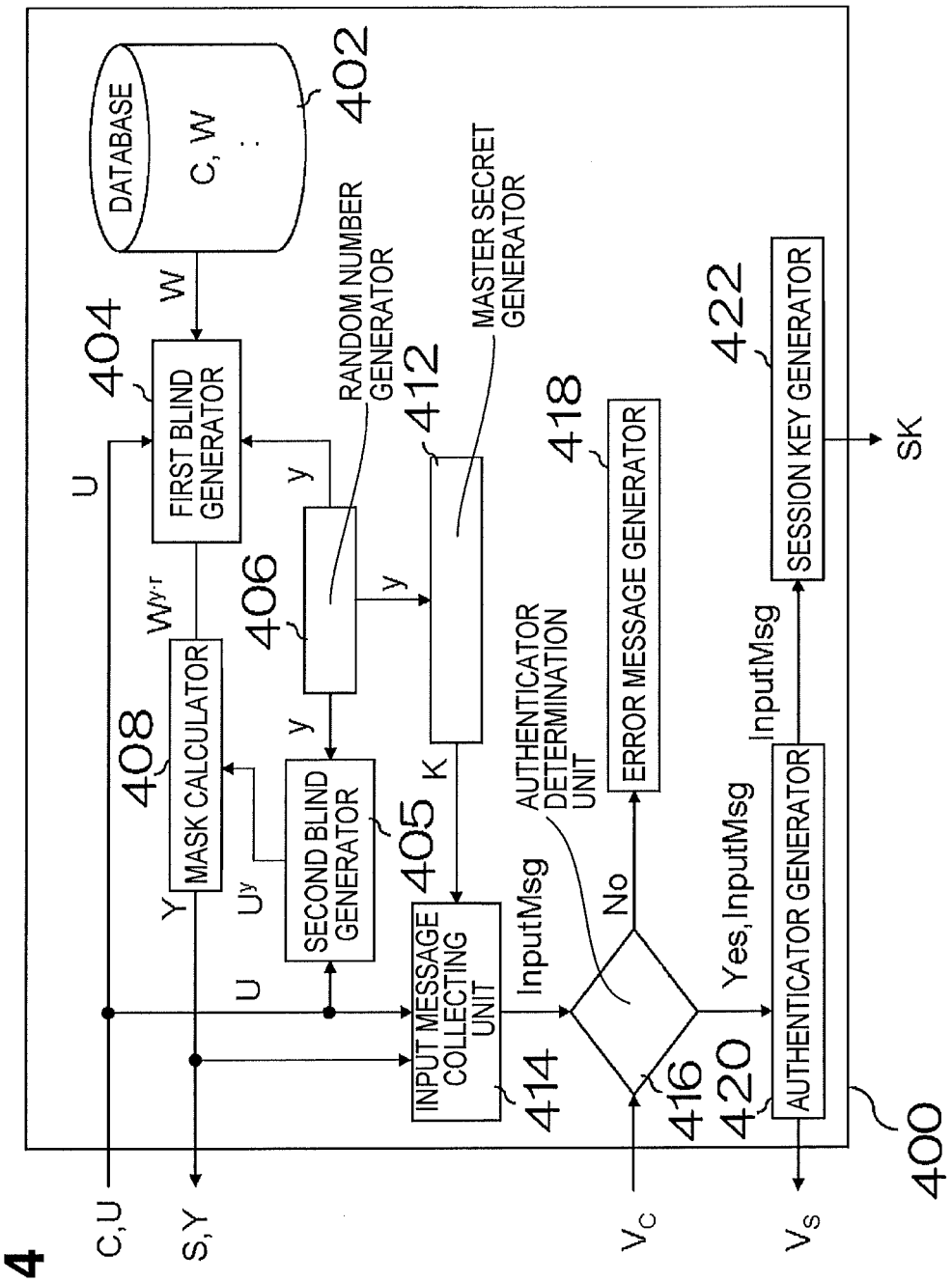
FIG. 4 is a block diagram for explaining the arrangement and functions of a server according to the first embodiment.

FIG. 4 is a block diagram for explaining the functional arrangement and operation of the server authentication apparatus 400 which executes the protocol execution processing of the authentication system 100. The protocol execution processing of the authentication system 100 in the server authentication apparatus 400 will be described below with reference to FIG. 4.

The server authentication apparatus 400 holds the user ID and password authentication data [C, W] required to execute the protocol execution processing in its internal memory or the database 402.

A master secret generator 412 computes and outputs a master secret K to have, as an input, a random number y (y∈(Z/qZ)*) which is randomly generated by a random number generator 406, using:

$$K=g^y$$

After a short time, the server authentication apparatus 400 receives a message [C, U] from the user terminal 300. A first blind generator 404 computes and outputs a first blind W$^{y \cdot r}$ to have, as inputs, the public value U received from the terminal 300, the password authentication data W read out from the database 402, and the random number y randomly generated by the random number generator 406, using:

$$W^{y \cdot r}$$

for r=H$_2$(C∥S∥U)

As another method, the server may generate r, and may then send it to the client. A second blind generator 405 computes and outputs a second blind U$^y$ to have, as inputs, the public value U received from the user terminal 300 and the random number y randomly generated by the random number generator 406, using:

$$U^y$$

A mask calculator 408 computes and outputs a value Y to have, as inputs, the first blind W$^{y \cdot r}$ output from the first blind generator 404 and the second blind U$^y$ output from the second blind generator 405, using:

$$Y=U^y \cdot W^{y \cdot r}$$

The server authentication apparatus 400 sends S as a server ID and the value Y output from the mask calculator 408 to the user terminal 300 via a communication processor (not shown).

Subsequently, an input message collecting unit 414 outputs an input message InputMsg to have, as inputs, the public value U received from the user terminal 300, the value Y output from the mask calculator 408, and the master secret K output from the master secret generator 412. In this case, the input message is described as:

$$InputMsg=C\|S\|U\|Y\|K$$

After a short time, the server authentication apparatus 400 receives a message [Vc] from the user terminal 300. An authenticator determination unit 416 confirms if the authenticator Vc received from the user terminal 300 is correctly generated value. The authenticator determination unit 416 computes a hash function H(1∥InputMsg) based on the input message InputMsg supplied from the input message collecting unit 414, and compares it with the authenticator Vc received from the user terminal 300. In the determination processing of the authenticator determination unit 416, when the authenticator Vc does not match the hash function H(1∥InputMsg), the authenticator determination unit 416 notifies an error message generator 418 of the mismatch. In response to this notification, the error message generator 418 generates an error message, and interrupts the processing.

On the other hand, in the determination processing of the authenticator determination unit 416, when it is determined that the authenticator Vc matches the hash function H(1∥InputMsg), the user terminal 300 is authenticated as an authentic apparatus. In this case, a MAC (Message Authentication Code) may be used in place of the hash function H. An authenticator generator 420 computes and outputs an authenticator Vs to have the input message InputMsg supplied from the input message collecting unit 414 as an input using:

$$Vs = H(2 \| \text{InputMsg})$$

The server authentication apparatus 400 sends the authenticator Vs output from the authenticator generator 420 to the user terminal 300 via a communication processor (not shown). A session key generator 422 computes and outputs a session key SK to have the input message InputMsg input from the input message collecting unit 414 as an input using:

$$SK = H(3 \| \text{InputMsg})$$

[3. Modification of Authentication System 100]

In the authentication system 100, the first blind generator 404 and second blind generator 405 of the server authentication apparatus 400 compute the first and second blinds by $W^{y \cdot r}$ and $U^y$. However, these blinds may be computed as follows:

First blind: $W^y$

Second blind: $U^{y \cdot r}$ (for $r = H_2(C \| S \| U)$)

That is, in the first example, r is used in the power computations associated with the password authentication data W. However, in this modification, r is used in the power computations associated with the public value U.

With the modification of the computation methods of the first and second blinds, the computation of the value Y computed by the mask calculator 408 is modified as follows:

$$Y = U^{y \cdot r} \cdot W^y$$

In case of such modification, the computation formula of the blind b in the blind generator 308 of the user terminal 300 is also modified as follows:

$$b = u \times r + H_1(C \| S \| pw) \bmod q \text{ (for } r = H_2(C \| S \| U))$$

That is, in the first example, r is multiplied by the term associated with the password pw. However, in this modification, r is multiplied by the random number u.

In the authentication system 100 according to the first embodiment, since the master secret in the server can be computed using:

$$K = g^y$$

the calculation amount of the server can be greatly reduced compared to the related art that requires the power computations of $g^{u \times y}$. Also, since the master secret in the client can be computed using:

$$K = Y^{(1/b \bmod q)}$$

the calculation amount can also be reduced compared to the related art that requires the power computations of $g^{u \times y}$. These advantages are not lost even in the aforementioned modification. In combination with use of the password and password authentication data W, the authentication system 100 is secure against various attacks such as a KCI attack on the public network, and can successfully reduce the calculation amounts of the client and server compared to the conventional method.

Second Embodiment

Application of System of First Embodiment

Figure 5:
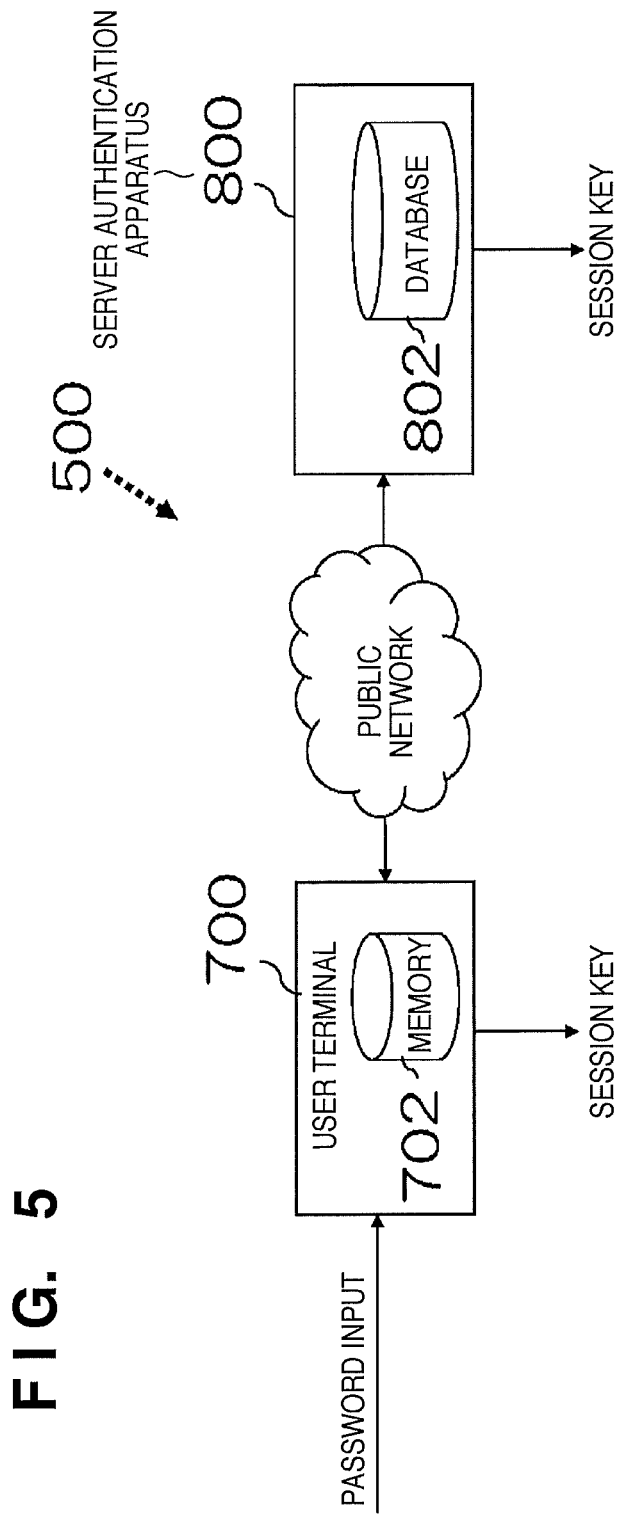
FIG. 5 is a diagram for explaining an overview of the second embodiment.

An example in which the authentication method using only a password introduced in the first embodiment is applied to a two-factor authentication method will be described below. FIG. 5 depicts the overall arrangement of an authentication system 500 used as an example for explaining this application example.

The authentication system 500 is configured by a user terminal 700 and server authentication apparatus 800. In the authentication system 500, the user terminal 700 makes certain characteristic operations based on recorded information held in, for example, a memory 702 in addition to a password input by the user. The server authentication apparatus 800 holds an identifier WID and authentication data in, for example, a database 802. The identifier WID can include, for example, an identifier of the terminal 700 and a count value. The terminal 700 and server authentication apparatus 800 mutually authenticate with each other via a public network such as the Internet, and only when the mutual authentication has succeeded, they assure the same session key, and update the self recorded information for the next session. Then, the server authentication apparatus 800 can no longer conduct an exhaustive search of a password for user's authentication data, and the security of the user terminal 700 never drops even when recorded information leaks.

[1. Initialization of Authentication System 500]

Figure 6:
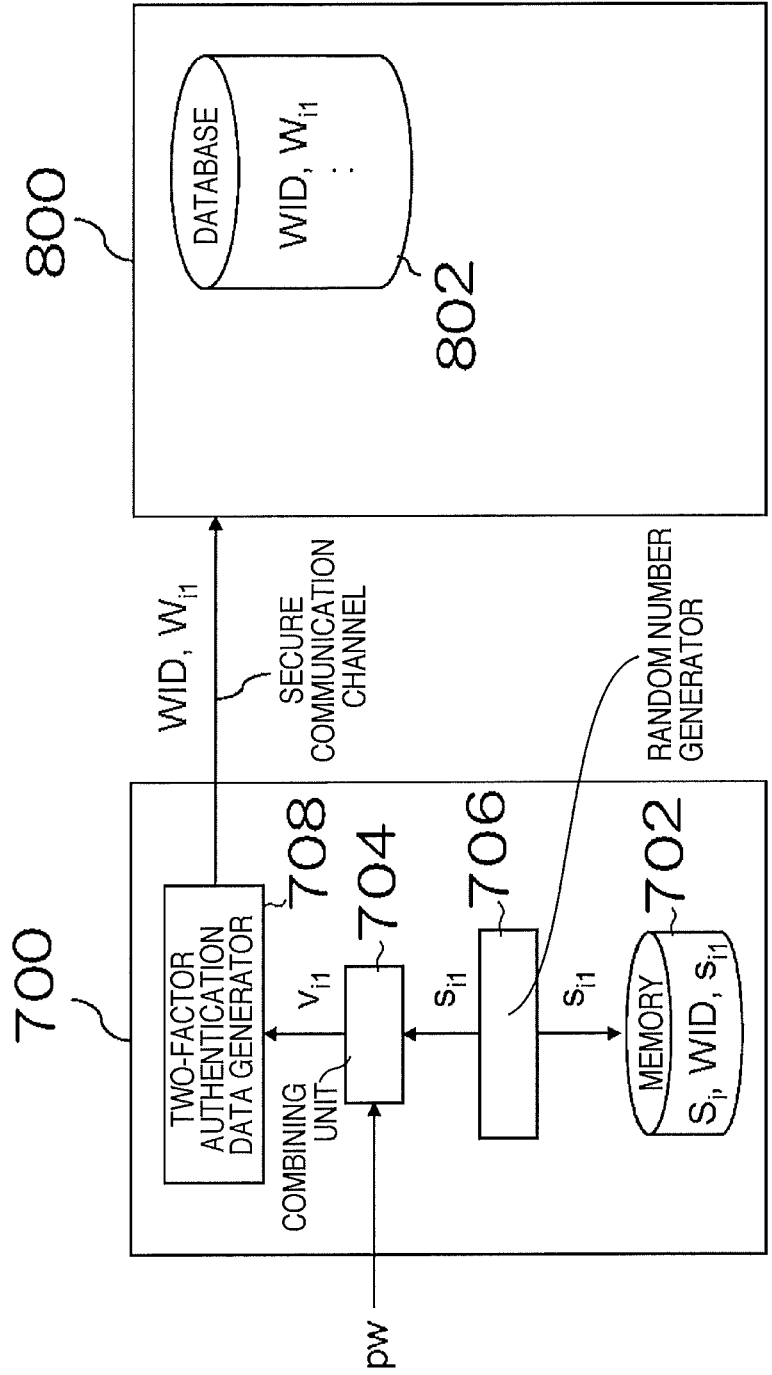
FIG. 6 is a block diagram for explaining an initialization stage in the second embodiment.

Initially, initialization processing in the authentication system 500 will be described below with reference to FIG. 6. FIG. 6 is a block diagram for explaining the functional arrangements and operations of the user terminal 700 and server authentication apparatus 800 in association with the initialization processing of the authentication system 500. In the initialization processing of the authentication system 500, the user terminal 700 executes initialization processing using a secure communication channel (for example, direct registration, mailing, or information using a telephone) with the server authentication apparatus 800 based on a password input by the user. The user terminal 700 saves CS1 as recorded information in the internal memory 702, and the server authentication apparatus 800 saves SS1 as recorded information in its internal memory or the database 802.

<Process in User Terminal 700>

As shown in FIG. 6, in the initialization processing in the user terminal 700, a combining unit 704 computes and outputs a combined value $v_{i1}$ to have, as inputs, a password pw input from the user and a random number $s_{i1}$ ($s_{i1} \in (Z/qZ)^*$) which is randomly generated by a random number generator 706, using:

$$v_{i1} = s_{i1} + H_1(C \| S_i \| pw) \bmod q$$

where $S_i$ indicates the i-th server. A two-factor authentication data generator 708 computes and outputs authentication data $W_{i1}$ to have the combined value $v_{i1}$ output from the combining unit 704 as an input using:

$$W_{i1} = g^{v_{i1}}$$

Then, the two-factor authentication data generator 708 sends [WID, $W_{i1}$], that is, the identifier WID and authentication data, to the server authentication apparatus 800. The user terminal 700 saves [$S_i$, WID, $s_{i1}$], that is, the server ID, the identifier WID, and the random number $s_{i1}$ generated by the random number generator 706 in its internal memory 702 as recorded information [CS1].

<Process in Server Authentication Apparatus 800>

As shown in FIG. 6, in the initialization processing in the server authentication apparatus 800, the server authentication apparatus 800 saves [WID, $W_{i1}$], that is, the identifier WID and authentication data [WID, $W_{i1}$] received from the user terminal 700 in its internal memory or the database 802 as recorded information [SS1].

[2. j-th Protocol Execution of Authentication System 500]

Figure 7:
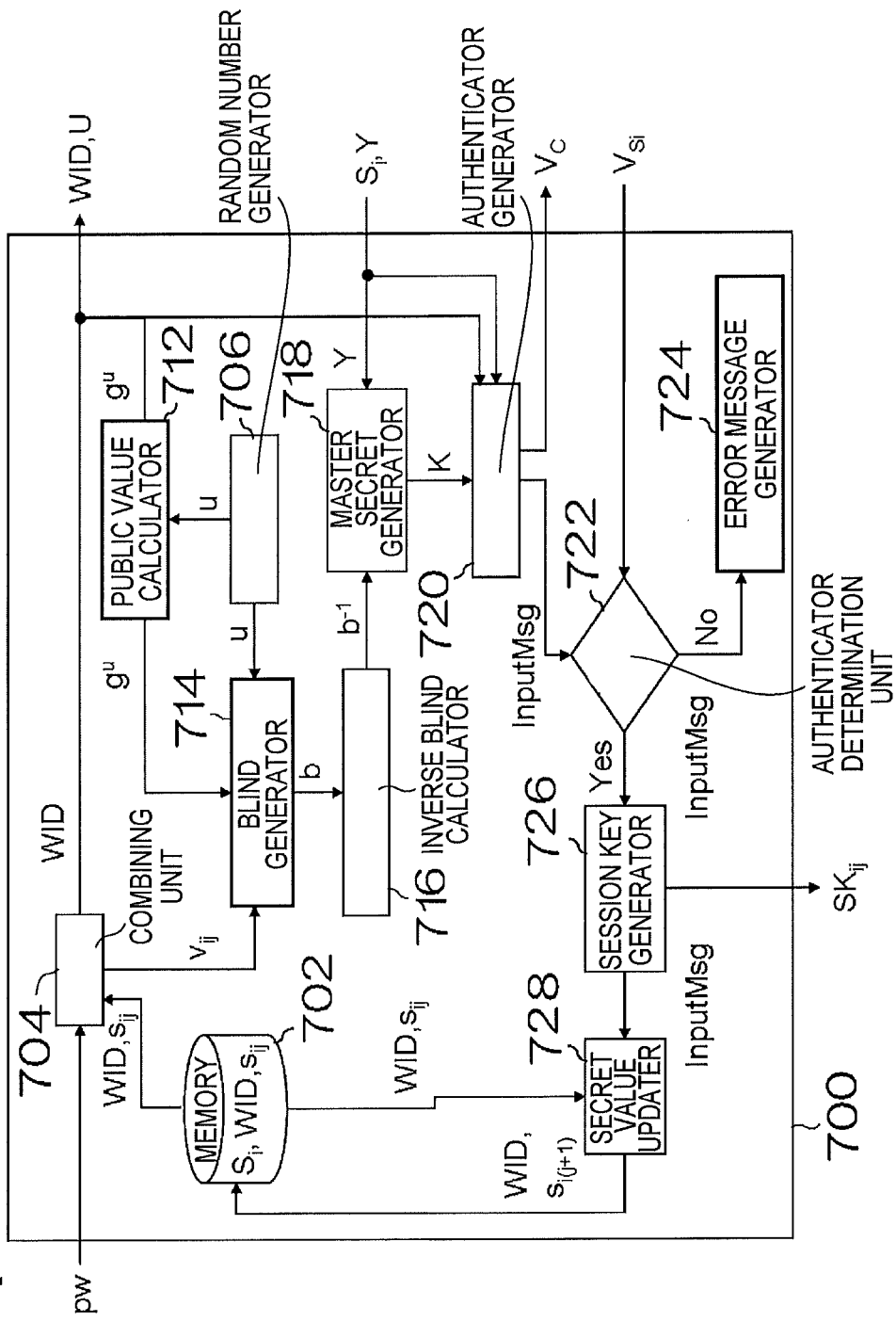
FIG. 7 is a block diagram for explaining the arrangement and functions of a client according to the second embodiment.
Figure 8:
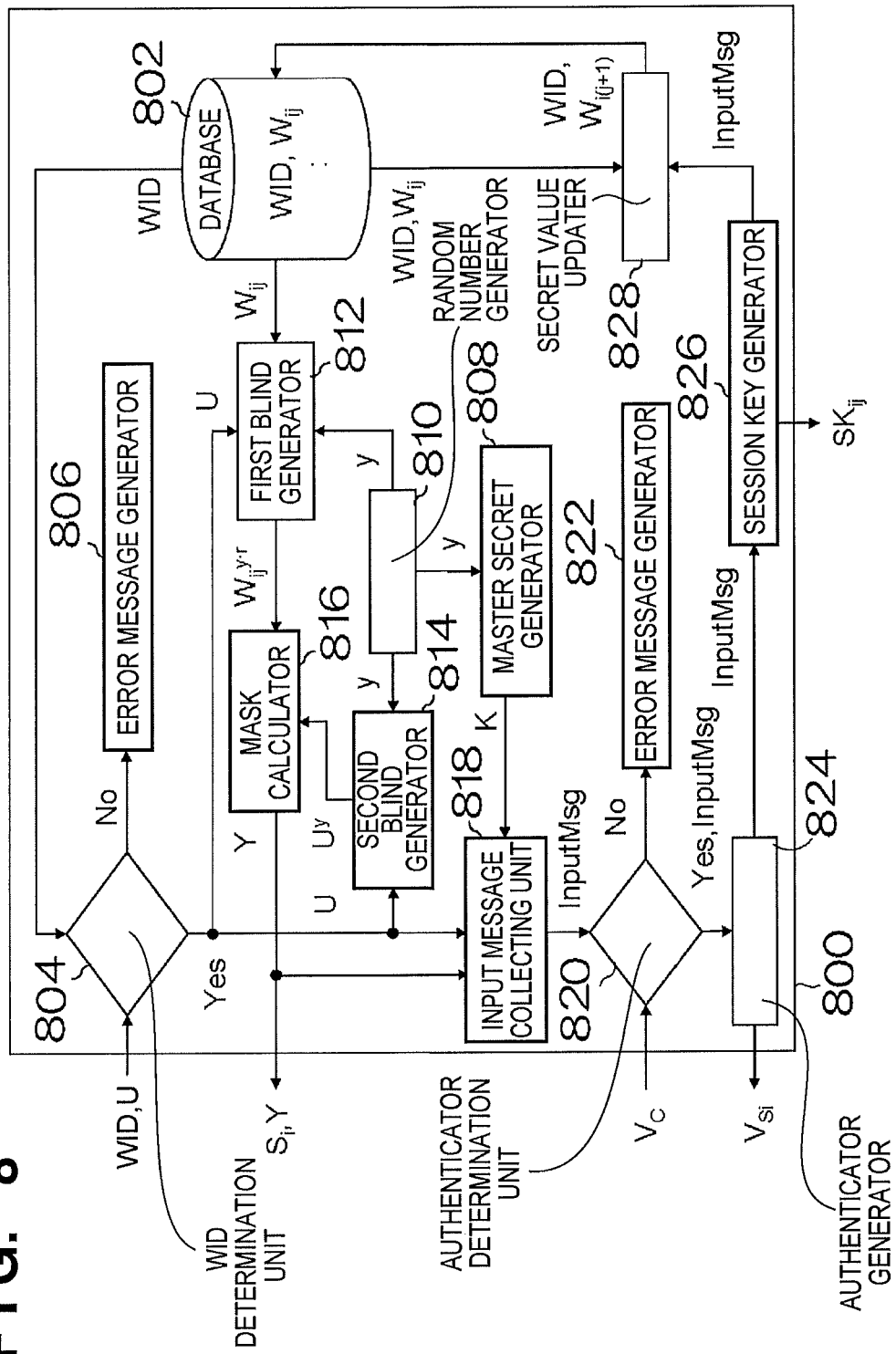
FIG. 8 is a block diagram for explaining the arrangement and functions of a server according to the second embodiment.

The j-th protocol execution processing in the authentication system 500 will be described below with reference to FIGS. 7 and 8. FIGS. 7 and 8 are block diagrams for respectively explaining the functional arrangements and operations of the user terminal 700 and server authentication apparatus 800, which execute the j-th protocol execution processing of the authentication system 500. In FIGS. 7 and 8, j is an integer which satisfies j≧1. In the j-th protocol execution processing of the authentication system 500, the user terminal 700 makes certain characteristic operations using a password pw input from the user and recorded information CSj held in the memory 702. Then, the user terminal 700 mutually authenticates with the server authentication apparatus 800 which holds recorded information SSj in, for example, a database via the public network such as the Internet. Only when the mutual authentication has succeeded, the user terminal 700 and server authentication apparatus 800 assure the same session key. The j-th protocol execution processing to be described below is executed by the user terminal 700 and server authentication apparatus 800 after initialization of the authentication system 500 is complete (when j=1) or after the (j−1)-th protocol execution processing of the authentication system 500 ends (that is, when CSj=($S_i$, WID, $s_{ij}$) and SSj= (WID, $W_{ij}$)).

<Process in User Terminal 700>

The j-th protocol execution processing of the authentication system 500 in the user terminal 700 will be described first with reference to FIG. 7. After the aforementioned initialization processing of the authentication system 500, prior to the j-th protocol execution processing of the authentication system 500, the user terminal 700 holds [$S_i$, WID, $s_{ij}$] as the recorded information [CSj] in its internal memory 702. The combining unit 704 computes and outputs a combined value $v_{ij}$ to have, as inputs, the password pw input from the user and the random number $s_{ij}$ read out from the memory 702, using:

$$v_{ij}=s_{ij}+H_1(C\|S\|pw) \bmod q$$

A public value calculator 712 computes and outputs a public value U to have, as an input, a random number u (u∈(Z/qZ)*), which is randomly generated by the random number generator 706, using:

$$U=g^u$$

A blind generator 714 computes and outputs a blind b to have, as inputs, the combined value $v_{ij}$ output from the combining unit 704, the random number u randomly generated by the random number generator 706, and the public value U output from the public value calculator 712, using:

$$b=u+v_{ij} \times r \bmod q$$

wherein r is given by:

$$r=H_2(C\|S_i\|U)$$

An inverse blind calculator 716 computes and outputs an inverse blind $b^{-1}$ to have, as an input, the blind b output from the blind generator 714, using:

$$b^{-1} \bmod q$$

The user terminal 700 sends the identifier WID read out from the memory 702 and the public value U output from the public value calculator 712 to the server authentication apparatus 800 via a communication processor (not shown).

After a short time, the user terminal 700 receives a message [$S_i$, Y] from the server authentication apparatus 800. A master secret generator 718 computes and outputs a master secret K to have, as inputs, a value Y received from the server authentication apparatus 800 and the inverse blind $b^{-1}$ output from the inverse blind calculator 716, using:

$$K=Y^{(1/b \bmod q)}$$

Subsequently, an authenticator generator 720 computes an authenticator Vc to have, as inputs, the identifier WID read out from the memory 702, the public value U output from the public value calculator 712, the value Y received from the server authentication apparatus 800, and the master secret K output from the master secret generator 718, using:

$$Vc=H(1\|WID\|S_i\|U\|Y\|K)$$

The authenticator generator 720 then outputs the authenticator Vc together with an input message InputMsg. Note that the input message is described as:

$$\text{InputMsg}=WID\|S_i\|U\|Y\|K$$

In this case, a MAC (Message Authentication Code) may be used in place of the hash function H. The user terminal 700 sends the authenticator Vc output from the authenticator generator 720 to the server authentication apparatus 800 via a communication processor (not shown).

After a short time, the user terminal 700 receives a message [$V_{Si}$] from the server authentication apparatus 800. An authenticator determination unit 722 confirms if an authenticator $V_{Si}$ received from the server authentication apparatus 800 is a correctly generated value. The authenticator determination unit 722 compares a hash function H(2∥InputMsg) with the authenticator $V_{Si}$ received from the server authentication apparatus 800 based on the input message InputMsg input from the authenticator generator 720. In this comparison processing, when the authenticator $V_{Si}$ and the hash function H(2∥InputMsg) do not match, the authenticator determination unit 722 notifies an error message generator 724 of the mismatch. In response to this notification, the error message generator 724 generates an error message, and interrupts the processing.

On the other hand, when it is determined in the determination processing of the authenticator determination that the authenticator $V_{Si}$ and hash function H(2∥InputMsg) match, the server authentication apparatus 800 is authenticated as an authentic apparatus to proceed with the next processing. A session key generator 726 computes and outputs a session key $SK_{ij}$ to have, as an input, the input message InputMsg input from the authenticator generator 720, using:

$$SK_{ij}=H(3\|\text{InputMsg})$$

A secret value updater 728 computes and outputs a (j+1)-th identifier WID and random number $s_{i(j+1)}$ to have, as inputs, the identifier WID and random number $s_{ij}$ read out from the memory 702 and the input message InputMsg input from the authenticator generator 720, using:

$$WID = H_1(WID\|InputMsg)$$

$$s_{i(j+1)} = s_{ij} + H_1(InputMsg) \bmod q$$

The user terminal 700 rewrites [WID, $s_{ij}$] as the set of the current identifier WID and random number held in the memory 702 by [WID, $s_{i(j+1)}$] as a set of the next identifier WID and random number by the secret value updater 728.

The generated session key SK can be used when the user terminal 700 encrypts a client-side data key cdk and sends the encrypted key to the server authentication apparatus 800. The generated session key SK can also be used to decrypt an encrypted server-side data key sdk, which is encrypted by and is sent from the server authentication apparatus 800 to the user terminal 700.

After the session key SK is generated, the user terminal 700 encrypts the data key cdk using the session key SK, and sends it to the server authentication apparatus 800. Alternatively, the server authentication apparatus 800 encrypts the server-side data key sdk using a session key generated by itself, and sends it to the user terminal 700. The user terminal 700 decrypts the server-side data key sdk using the session key SK generated by itself. If the data key sdk is successfully decrypted, the user terminal 700 can restore a data key dk using cdk and sdk.

The data key dk is given by:

$$dk' = cdk(+)sdk, \text{ or}$$

$$dk' = cdk + sdk \bmod q, \text{ or}$$

$$dk' = cdk \times sdk \bmod q,$$

and can be restored by:

$$dk = dk', \text{ or}$$

$$dk = (dk')(+)hpw, \text{ or}$$

$$dk = (dk') + hpw \bmod q, \text{ or}$$

$$dk = (dk') \times hpw \bmod q, \text{ or}$$

a value computed from an output of a function $H_3()$ having at least dk' and hpw as inputs, where (dk') indicates a step of computing a value dk' for the first time,
hpw is a value which can be computed from an output of a function $H_1()$ or one-way function $F_1()$ having at least the password pw as an input, and (+) is an exclusive OR.

<Process in Server Authentication Apparatus 800>

The j-th protocol execution processing of the authentication system 500 in the server authentication apparatus 800 will be described below with reference to FIG. 8. After the aforementioned initialization processing of the authentication system 500, prior to the j-th protocol execution processing of the authentication system 500, the server authentication apparatus 800 holds [WID, $W_{ij}$] as recorded information [SSj] in a memory included in a storage device or the database 802.

The server authentication apparatus 800 receives a message [WID, U] from the user terminal 700. A WID determination unit 804 confirms authenticity of an identifier WID received from the user terminal 700. When the identifier WID read out from the database is compared with the identifier WID received from the user terminal 700, and when they do not match, the WID determination unit 804 notifies an error message generator 806 of the mismatch. In response to this notification, the error message generator 806 generates an error message, and interrupts the processing. On the other hand, in the determination processing of the WID determination unit 804, when the identifier WID read out from the database is compared with the identifier WID received from the user terminal 700 and when they match, the next processing is proceeded.

A master secret generator 808 computes and outputs a master secret K to have, as an input, a random number y ($y \in (Z/qZ)^*$) which is randomly generated by a random number generator 810, using:

$$K = g^y$$

A first blind generator 812 computes and outputs a first blind $W_{ij}^{y \cdot r}$ to have, as inputs, the public value U received from the user terminal 700, authentication data $W_{ij}$ read out from the database, and the random number y randomly generated by the random number generator 810, using:

$$W_{ij}^{y \cdot r}$$

wherein r is given by:

$$r = H_2(C\|S_i\|U)$$

A second blind generator 814 computes and outputs a second blind $U^y$ to have, as inputs, the public value U received from the user terminal 700 and the random number y randomly generated by the random number generator 810, using:

$$U^y$$

A mask calculator 816 computes and outputs a value Y to have, as inputs, the first blind $W_{ij}^{y \cdot r}$ output from the first blind generator 812 and the second blind $U^y$ output from the second blind generator 814, using:

$$Y = U^y \cdot W_{ij}^{y \cdot r}$$

The server authentication apparatus 800 sends Si as a server ID and the value Y output from the mask calculator 816 to the user terminal 700 via a communication processor (not shown).

Subsequently, an input message collecting unit 818 outputs an input message InputMsg to have, as inputs, the identifier WID and public value U received from the user terminal 700, the value Y output from the mask calculator 816, and the master secret K output from the master secret generator 808. In this case, the input message InputMsg is described as:

$$InputMsg = WID\|Si\|U\|Y\|K$$

After a short time, the server authentication apparatus 800 receives a message [Vc] from the user terminal 700.

An authenticator determination unit 820 confirms if an authenticator Vc received from the user terminal 700 is a correctly generated value. The authenticator determination unit 820 executes comparison processing between the authenticator Vc received from the user terminal 700 and a hash function H(1∥InputMsg) based on the input message InputMsg input from the input message collecting unit 818. In this comparison processing, when the authenticator Vc does not match the hash function H(1∥InputMsg), the authenticator determination unit 820 notifies an error message generator 822 of the mismatch. In response to this notification, the error message generator 822 generates an error message, and interrupts the processing. On the other hand, when it is determined in the comparison processing that the received authenticator Vc matches the hash function H(1∥InputMsg), since the user terminal 700 is authenticated as an authentic apparatus, the next processing is proceeded. Note that a MAC (Message Authentication Code) may be used in place of the hash function H in this case.

An authenticator generator 824 computes and outputs an authenticator $V_{Si}$ to have, as an input, the input message InputMsg input from the input message collecting unit 818, using:

$$V_{Si}=H(2\|\text{InputMsg})$$

The server authentication apparatus 800 sends the authenticator $V_{Si}$ output from the authenticator generator 824 to the user terminal 700 via a communication processor (not shown).

A session key generator 826 computes and outputs a session key $SK_{ij}$ to have, as an input, the input message InputMsg input from the input message collecting unit 818, using:

$$SK_{ij}=H(3\|\text{InputMsg})$$

A secret value updater 828 computes and outputs a (j+1)-th identifier WID and authentication data $W_{i(j+1)}$ to have, as inputs, the identifier WID and authentication data $W_{ij}$ read out from the database 802, and the input message InputMsg input from the input message collecting unit 818, using:

$$WID=H_1(WID\|\text{InputMsg})$$

$$W_{i(j+1)}=W_{ij}\cdot g^{H1(\text{InputMsg})}$$

The server authentication apparatus 800 rewrites [WID, $W_{ij}$] as the set of the current identifier WID and authentication data held in the database 802 by [WID, $W_{i(j+1)}$] as a set of the next identifier WID and authentication data output from the secret value updater 828.

The generated session key SK can be used when the server authentication apparatus 800 encrypts a server-side data key sdk and sends it to the user terminal 700. Also, the session key SK can also be used to decrypt an encrypted client-side data key, which is encrypted by and sent from the user terminal 700 to the server authentication apparatus 800.

After the session key SK is generated, the server authentication apparatus 800 encrypts a data key sdk using the session key SK, and sends it to the user terminal 700. Alternatively, the user terminal 700 encrypts a client-side data key cdk using a session key generated by itself, and sends it to the server authentication apparatus 800. The server authentication apparatus 800 decrypts the received client-side data key cdk using the session key SK generated by itself. When the data key cdk is successfully decrypted, the server authentication apparatus 800 can restore a data key dk using cdk and sdk.

[3. Modification of Authentication System 500]

As in the authentication system 100 according to the first embodiment, in the authentication system 500 according to the second embodiment, the computation method of the value Y in the mask calculator 816 of the server authentication apparatus 800 can be modified as follows. In this modification, the first and second blinds are computed as follows:

First blind: $W_{ij}^y$

Second blind: $U^{y \cdot r}$ (for $r=H_2(C\|S_i\|U)$)

That is, in the first example, r is used in the power computations associated with the password authentication data $W_{ij}$. However, in this modification, r is used in the power computations associated with the public value U. Then, the value Y obtained by the mask calculator 816 is computed as follows:

$$Y=U^{y \cdot r} \cdot W_{ij}^y$$

With these modifications, the computation formula of the blind b in the blind generator 714 in the user terminal 700 is modified as follows:

$$b=u \times r + v_{ij} \bmod q \text{ (for } r=H_2(C\|S_i\|U))$$

That is, in the first example, r is multiplied by the term associated with the combined value However, in this modification, r is multiplied by the random number u.

[4. Another Modification of Authentication System 500]

By modifying the authentication system 500 according to the second embodiment as follows, a function of detecting a password online attack of an attacker can be added.

In addition to the aforementioned initialization processing of the authentication system 500, the user terminal 700 sends a key MacK used to generate a MAC (Message Authentication Code) to the server authentication apparatus 800 via a secure communication channel. The user terminal 700 saves the key MacK together with another recorded information in the internal memory 702. The server authentication apparatus 800 saves the key MacK received from the user terminal 700 together with another recorded information in the internal memory or database 802.

In addition to the aforementioned j-th protocol execution processing of the authentication system 500, the user terminal 700 generates a MAC using the key MacK read out from the internal memory 702 for a message to be sent to the server authentication apparatus 800, and sends the MAC to the server authentication apparatus 800 together with the message. Likewise, the server authentication apparatus 800 generates a MAC using the key MacK read out from the internal memory or database 802 for a message to be sent to the user terminal 700, and sends the MAC to the user terminal 700 together with the message. The sent MAC is verified using the key MacK saved in each of the client and server.

In the j-th protocol execution processing of the authentication system 500, when the processing is interrupted due to occurrence of an arbitrary error (for example, when the MAC verification has failed), each of the user terminal 700 and server authentication apparatus 800 saves a message received at that time and other pieces of information (for example, a time, IP address, etc.) in its own memory or database as a log.

When the user terminal 700 and server authentication apparatus 800 authenticate with each other and share a session key after completion of the j-th protocol of the authentication system 500, the server authentication apparatus 800 sends pieces of log information saved so far in the internal memory or database 802 to the user terminal 700 via a secure communication channel protected by the session key, and deletes these pieces of log information. The user terminal 700 displays the number of times of online dictionary attacks associated with a password by an attacker to the user by comparing the pieces of log information received from the server authentication apparatus 800 and those saved so far in the internal memory 702. The user terminal 700 deletes the pieces of log information saved so far in the internal memory 702.

The online dictionary attack detection function of the authentication system 500 may use a Digital Signature in place of the MAC.

In the authentication system 500 according to the second embodiment, as in the authentication system 100 according to the first embodiment, since the master secret in the server can be computed using:

$$K=g^y$$

the calculation amount of the server can be greatly reduced compared to the related art that requires the power computations of $g^{u \cdot y}$. Also, since the master secret in the client can be computed using:

$$K=Y^{(1/b \bmod q)}$$

the calculation amount can also be reduced compared to the related art that requires the power computations of $g^{isy}$. These advantages are not lost even in the aforementioned modifications. In combination with security due to use of the two-factor authentication method in addition to the password and password authentication data W, the authentication system 500 can provide much advanced security against various attacks such as a KCI attack on the public network, and can successfully reduce the calculation amounts of the client and server compared to the conventional method.

Third Embodiment

Another Application Example of System of First Embodiment

Figure 9:
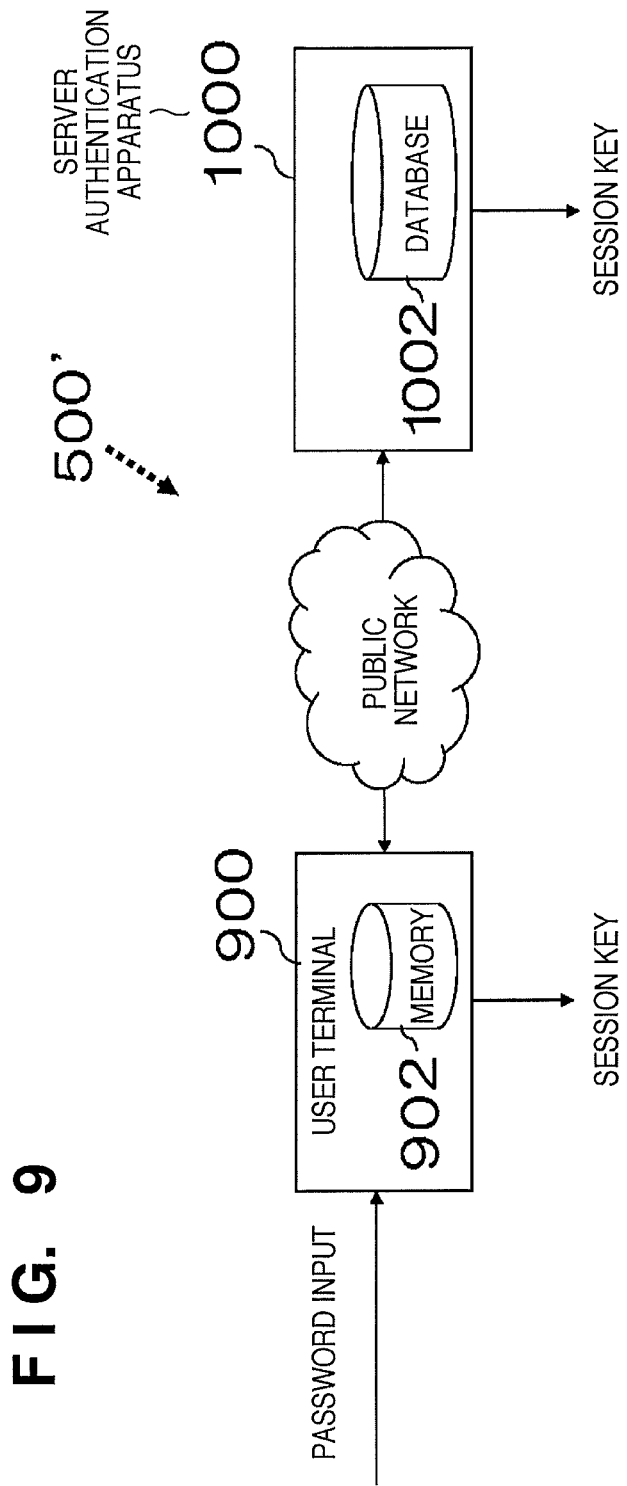
FIG. 9 is a diagram for explaining an overview of the third embodiment.

Another example in which the authentication method using only a password introduced in the first embodiment is applied to a two-factor authentication method will be described below. FIG. 9 depicts the overall arrangement of an authentication system 500' used as an example for explaining this application example.

The authentication system 500' is configured by a user terminal 900 and server authentication apparatus 1000. In the authentication system 500', the user terminal 900 makes certain characteristic operations based on recorded information held in, for example, a memory 902 in addition to a password input by the user. The server authentication apparatus 1000 holds an identifier WID, authentication data, and a public value T in, for example, a database 1002. The identifier WID can include, for example, an identifier of the terminal 900 and a count value. The terminal 900 and server authentication apparatus 1000 mutually authenticate with each other via a public network such as the Internet, and only when the mutual authentication has succeeded, they assure the same session key, and update the self recorded information for the next session. Then, the server authentication apparatus 1000 can no longer conduct an exhaustive search of a password for user's authentication data, and the security of the user terminal 900 never drops even when recorded information leaks.

[1. Initialization of Authentication System 500']

Figure 10:
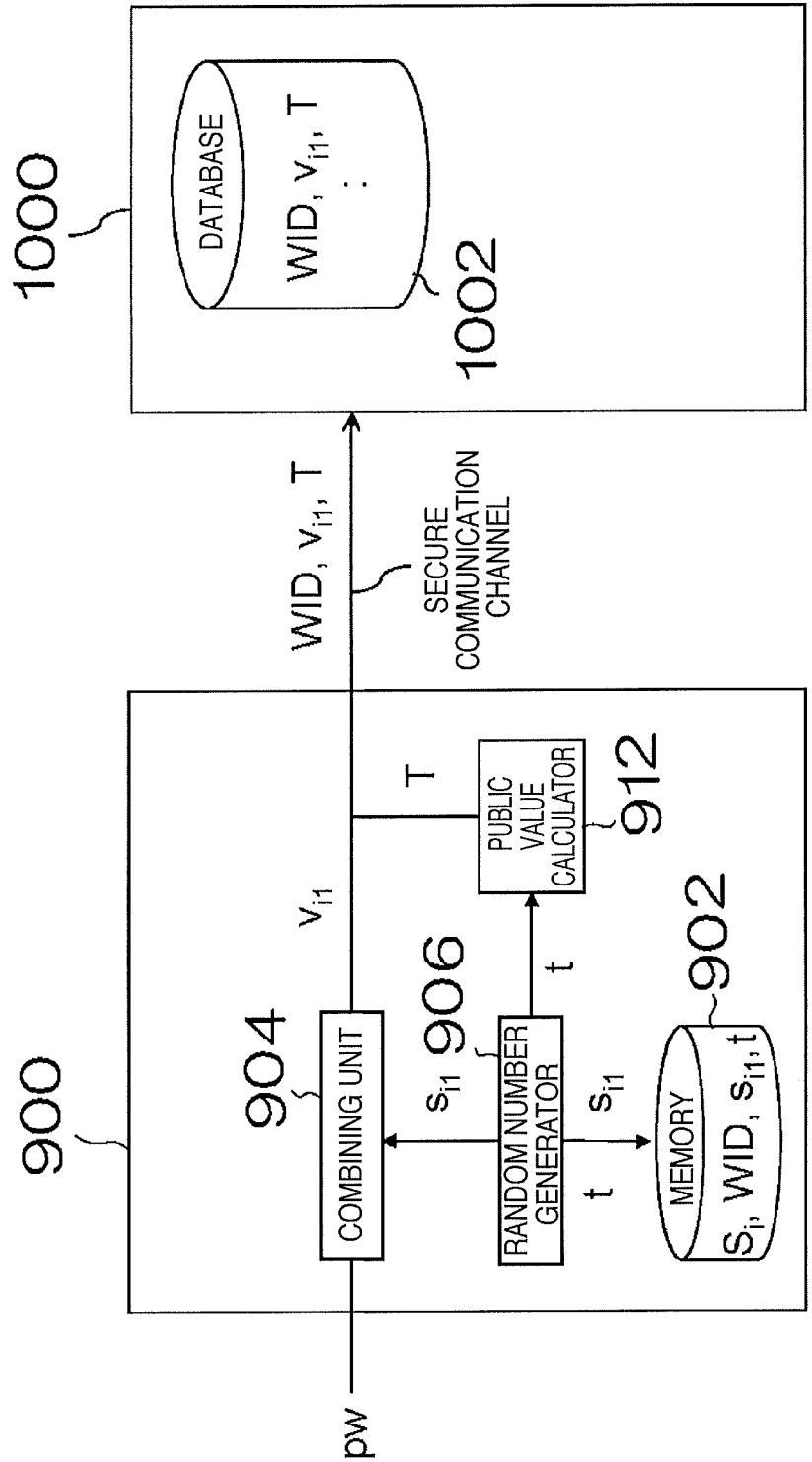
FIG. 10 is a block diagram for explaining an initialization stage in the third embodiment.

Initially, initialization processing in the authentication system 500' will be described below with reference to FIG. 10. FIG. 10 is a block diagram for explaining the functional arrangements and operations of the user terminal 900 and server authentication apparatus 1000 in association with the initialization processing of the authentication system 500'. In the initialization processing of the authentication system 500', the user terminal 900 executes initialization processing using a secure communication channel (for example, direct registration, mailing, or information using a telephone) with the server authentication apparatus 1000 based on a password input by the user. The user terminal 900 saves CS1 as recorded information in the internal memory 902, and the server authentication apparatus 1000 saves SS1 as recorded information in its internal memory or the database 1002.

<Process in User Terminal 900>

As shown in FIG. 10, in the initialization processing in the user terminal 900, a combining unit 904 computes and outputs a combined value $v_{i1}$ to have, as inputs, a password pw input from the user and a random number $s_{i1}$ ($s_{i1} \in (Z/qZ)^*$), which is randomly generated by a random number generator 906, using:

$$v_{i1}=s_{i1}+H_1(C\|S_i\|pw) \bmod q$$

where $S_i$ indicates the i-th server. A public value calculator 912 computes and outputs a public value T to have, as a input, a random number t ($t \in (Z/qZ)^*$) which is randomly generated by the random number generator 906, using:

$$T=g^t$$

Then, the public value calculator 912 sends an identifier WID, authentication data, and the public value, that is, [WID, $v_{i1}$, T] to the server authentication apparatus 1000. The user terminal 900 saves [$S_i$, WID, $s_{i1}$, T], that is, the server ID, the identifier WID, the random numbers $s_{i1}$ and t generated by the random number generator 906 in its internal memory 902 as recorded information [CS1].

<Process in Server Authentication Apparatus 1000>

As shown in FIG. 10, in the initialization processing in the server authentication apparatus 1000, the server authentication apparatus 1000 saves [WID, $v_{i1}$, T], that is, the identifier WID, authentication data, and public value received from the user terminal 900 in its internal memory or the database 1002 as recorded information [SS1].

[2. j-th Protocol Execution of Authentication System 500'T]

Figure 11:
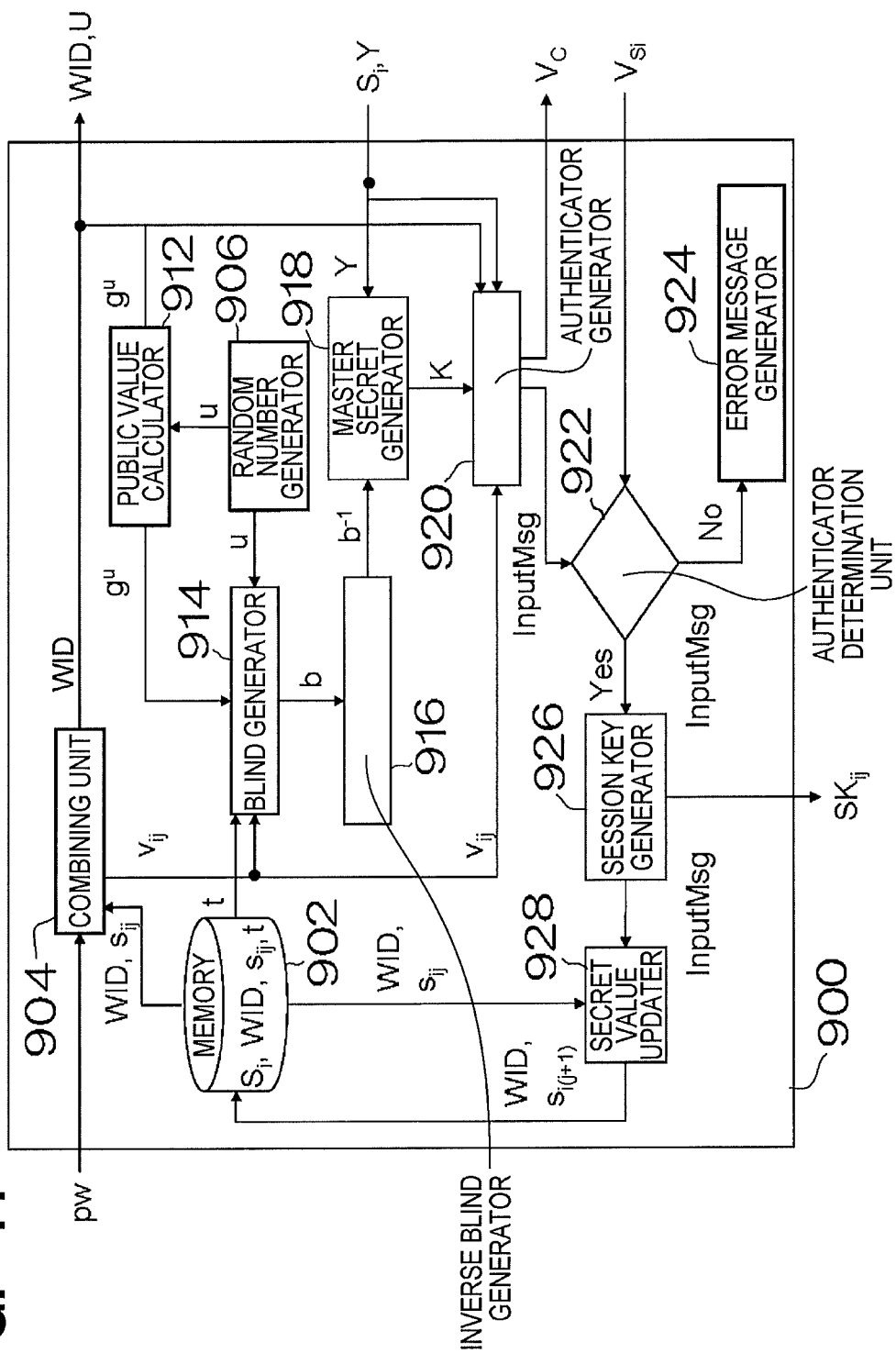
FIG. 11 is a block diagram for explaining the arrangement and functions of a client according to the third embodiment.
Figure 12:
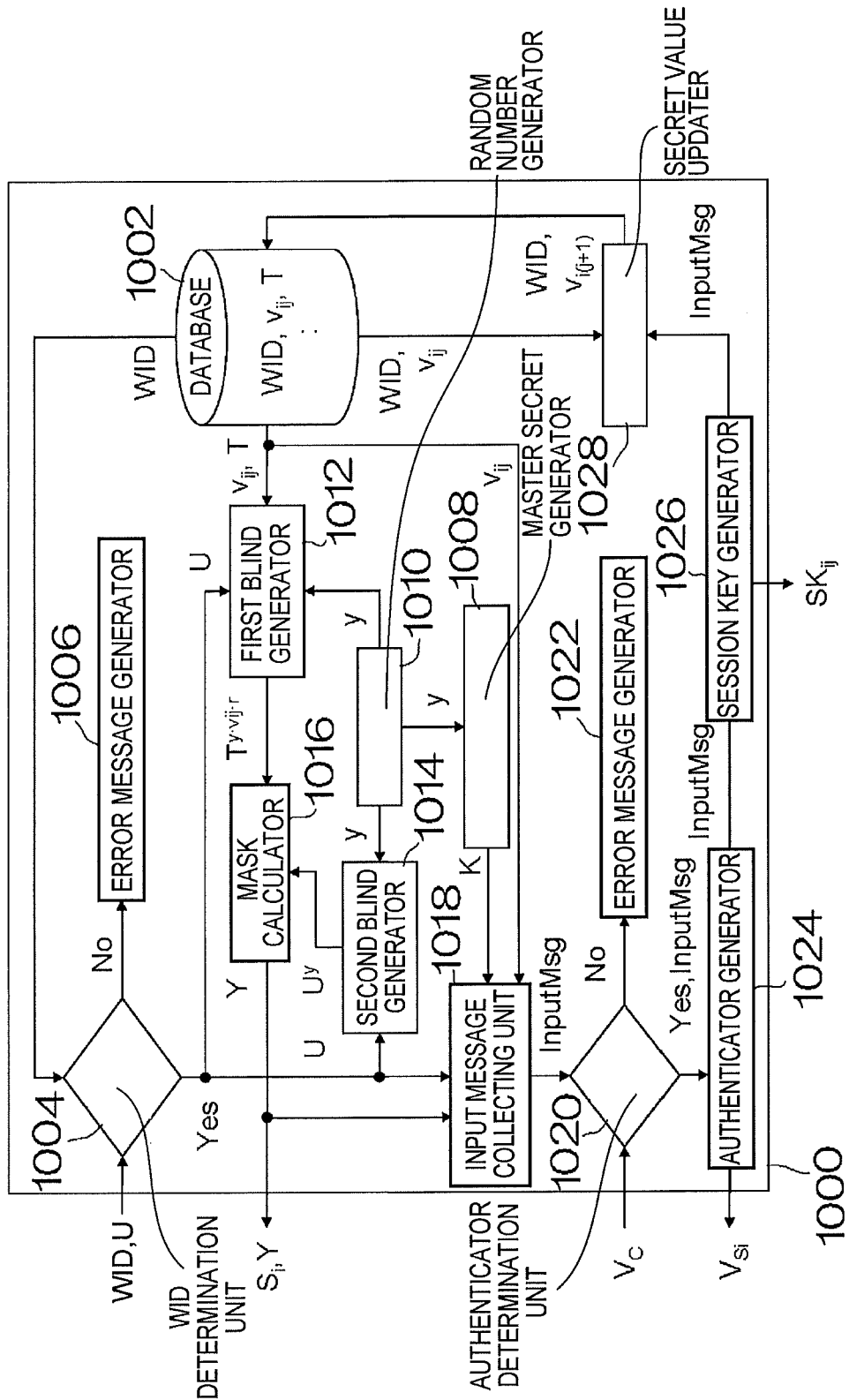
FIG. 12 is a block diagram for explaining the arrangement and functions of a server according to the third embodiment.

The j-th protocol execution processing in the authentication system 500' will be described below with reference to FIGS. 11 and 12. FIGS. 11 and 12 are block diagrams for respectively explaining the functional arrangements and operations of the user terminal 900 and server authentication apparatus 1000, which execute the j-th protocol execution processing of the authentication system 500'. In FIGS. 11 and 12, j is an integer which satisfies $j \geq 1$. In the j-th protocol execution processing of the authentication system 500', the user terminal 900 makes certain characteristic operations using the password pw input from the user and recorded information CSj held in the memory 902. Then, the user terminal 900 mutually authenticates with the server authentication apparatus 1000 which holds recorded information SSj in, for example, a database via the public network such as the Internet. Only when the mutual authentication has succeeded, the user terminal 900 and server authentication apparatus 1000 assure the same session key. The j-th protocol execution processing to be described below is executed by the user terminal 900 and server authentication apparatus 1000 after initialization of the authentication system 500' is complete (when j=1) or after the (j−1)-th protocol execution processing of the authentication system 500' ends (that is, when CSj=($S_i$, WID, $s_{ij}$, t) and SSj=(WID, $v_{ij}$, T)).

<Process in User Terminal 900>

The j-th protocol execution processing of the authentication system 500' in the user terminal 900 will be described first with reference to FIG. 11. After the aforementioned initialization processing of the authentication system 500', prior to the j-th protocol execution processing of the authentication system 500', the user terminal 900 holds, in advance, [$S_i$, WID, $s_{ij}$, t] as the recorded information [CSj] in its internal memory 902.

The combining unit 904 computes and outputs a combined value $v_{ij}$ to have, as inputs, the password pw input from the user and the random number $s_{ij}$ read out from the memory 902, using:

$$v_{ij}=s_{ij}+H_1(C\|S_i\|pw) \bmod q$$

A public value calculator 912 computes and outputs a public value U to have, as an input, a random number u ($u \in (Z/qZ)^*$) which is randomly generated by the random number generator 906, using:

$$U=g^u$$

A blind generator 914 computes and outputs a blind b to have, as inputs, the combined value $v_{ij}$ output from the combining unit 904, the random number u randomly generated by the random number generator 906, the random number t read out from the memory 902, and the public value U output from the public value calculator 912, using:

$$b = u + t \times v_{ij} \times r \bmod q$$

wherein r is given by:

$$r = H_2(C \| S_i \| U)$$

An inverse blind calculator 916 computes and outputs an inverse blind $b^{-1}$ to have, as an input, the blind b output from the blind generator 914, using:

$$b^{-1} \bmod q$$

The user terminal 900 sends the identifier WID read out from the memory 902 and the public value U output from the public value calculator 912 to the server authentication apparatus 1000 via a communication processor (not shown).

After a short time, the user terminal 900 receives a message $[S_i, Y]$ from the server authentication apparatus 1000. A master secret generator 918 computes and outputs a master secret K to have, as inputs, a value Y received from the server authentication apparatus 1000 and the inverse blind $b^{-1}$ output from the inverse blind calculator 916, using:

$$K = Y^{(1/b \bmod q)}$$

Subsequently, an authenticator generator 920 computes an authenticator Vc to have, as inputs, the identifier WID read out from the memory 902, the public value U output from the public value calculator 912, the value Y received from the server authentication apparatus 1000, the combined value $v_{ij}$ output from the combining unit 904, and the master secret K output from the master secret generator 918, using:

$$Vc = H(1 \| WID \| S_i \| U \| Y \| v_{ij} \| K)$$

The authenticator generator 920 then outputs the authenticator Vc together with an input message InputMsg. Note that the input message is described as:

$$\text{InputMsg} = WID \| S_i \| U \| Y \| v_{ij} \| K$$

In this case, a MAC (Message Authentication Code) may be used in place of the hash function H. The user terminal 900 sends the authenticator Vc output from the authenticator generator 920 to the server authentication apparatus 1000 via a communication processor (not shown).

After a short time, the user terminal 900 receives a message $[V_{Si}]$ from the server authentication apparatus 1000. An authenticator determination unit 922 confirms if an authenticator $V_{Si}$ received from the server authentication apparatus 1000 is a correctly generated value. The authenticator determination unit 922 compares a hash function $H(2 \| \text{InputMsg})$ with the authenticator $V_{Si}$ received from the server authentication apparatus 1000 based on the input message InputMsg input from the authenticator generator 920. In this comparison processing, when the authenticator $V_{Si}$ and the hash function $H(2 \| \text{InputMsg})$ do not match, the authenticator determination unit 922 notifies an error message generator 924 of the mismatch. In response to this notification, the error message generator 924 generates an error message, and interrupts the processing.

On the other hand, when it is determined in the determination processing of the authenticator determination that the authenticator $V_{Si}$ and hash function $H(2 \| \text{InputMsg})$ match, the server authentication apparatus 1000 is authenticated as an authentic apparatus to proceed with the next processing. A session key generator 926 computes and outputs a session key $SK_{ij}$ to have, as an input, the input message InputMsg input from the authenticator generator 920, using:

$$SK_{ij} = H(3 \| \text{InputMsg})$$

A secret value updater 928 computes and outputs a (j+1)-th identifier WID and random number $s_{i(j+1)}$ to have, as inputs, the identifier WID and random number $s_{ij}$ read out from the memory 902 and the input message InputMsg input from the authenticator generator 920, using:

$$WID = H_1(WID \| \text{InputMsg})$$

$$s_{i(j+1)} = s_{ij} + H_1(\text{InputMsg}) \bmod q$$

The user terminal 900 rewrites $[WID, s_{ij}]$ as the set of the current identifier WID and random number held in the memory 902 by $[WID, s_{i(j+1)}]$ as a set of the next identifier WID and random number output from the secret value updater 928.

<Process in Server Authentication Apparatus 1000>

The j-th protocol execution processing of the authentication system 500' in the server authentication apparatus 1000 will be described below with reference to FIG. 12. After the aforementioned initialization processing of the authentication system 500', prior to the j-th protocol execution processing of the authentication system 500', the server authentication apparatus 1000 holds $[WID, v_{ij}, T]$ as recorded information [SSj] in a memory included in a storage device or the database 1002.

The server authentication apparatus 1000 receives a message [WID, U] from the user terminal 900. A WID determination unit 1004 confirms authenticity of an identifier WID received from the user terminal 900. When the identifier WID read out from the database is compared with the identifier WID received from the user terminal 900, and when they do not match, the WID determination unit 1004 notifies an error message generator 1006 of the mismatch. In response to this notification, the error message generator 1006 generates an error message, and interrupts the processing. On the other hand, in the determination processing of the WID determination unit 1004, when the identifier WID read out from the database is compared with the identifier WID received from the user terminal 900 and when they match, the next processing is proceeded.

A master secret generator 1008 computes and outputs a master secret K to have, as an input, a random number y ($y \in (Z/qZ)^*$) which is randomly generated by a random number generator 1010, using:

$$K = g^y$$

A first blind generator 1012 computes and outputs a first blind $T^{y \cdot v_{ij} \cdot r}$ to have, as inputs, the public value U received from the user terminal 900, the authentication data $v_{ij}$ and public value T read out from the database, and the random number y randomly generated by the random number generator 1010, using:

$$T^{y \cdot v_{ij} \cdot r}$$

wherein r is given by:

$$r = H_2(C \| S_i \| U)$$

A second blind generator 1014 computes and outputs a second blind $U^y$ to have, as inputs, the public value U received from the user terminal 900 and the random number y randomly generated by the random number generator 1010, using:

$$U^y$$

A mask calculator 1016 computes and outputs a value Y to have, as inputs, the first blind $T^{y \cdot v_{ij} \cdot r}$ output from the first blind generator 1012 and the second blind $U^y$ output from the second blind generator 1014, using:

$$Y = U^y \cdot T^{y \cdot v_{ij} \cdot r}$$

The server authentication apparatus 1000 sends Si as a server ID and the value Y output from the mask calculator 1016 to the user terminal 900 via a communication processor (not shown).

Subsequently, an input message collecting unit 1018 outputs an input message InputMsg to have, as inputs, the identifier WID and public value U received from the user terminal 900, the value Y output from the mask calculator 1016, the authentication data $v_{ij}$ read out from the database, and the master secret K output from the master secret generator 1008. In this case, the input message InputMsg is described as:

$$\text{InputMsg} = WID \| S_i \| U \| Y \| v_{ij} \| K$$

After a short time, the server authentication apparatus 1000 receives a message [Vc] from the user terminal 900.

An authenticator determination unit 1020 confirms if an authenticator Vc received from the user terminal 900 is a correctly generated value. The authenticator determination unit 1020 executes comparison processing between the authenticator Vc received from the user terminal 900 and a hash function H(1∥InputMsg) based on the input message InputMsg input from the input message collecting unit 1018. In this comparison processing, when the authenticator Vc does not match the hash function H(1∥InputMsg), the authenticator determination unit 1020 notifies an error message generator 1022 of the mismatch. In response to this notification, the error message generator 1022 generates an error message, and interrupts the processing. On the other hand, when it is determined in the comparison processing that the authenticator Vc matches the hash function H(1∥InputMsg), since the user terminal 900 is authenticated as an authentic apparatus, the next processing is proceeded. Note that a MAC (Message Authentication Code) may be used in place of the hash function H in this case.

An authenticator generator 1024 computes and outputs an authenticator $V_{Si}$ to have, as an input, the input message InputMsg input from the input message collecting unit 1018, using:

$$V_{Si} = H(2 \| \text{InputMsg})$$

The server authentication apparatus 1000 sends the authenticator $V_{Si}$ output from the authenticator generator 1024 to the user terminal 900 via a communication processor (not shown).

A session key generator 1026 computes and outputs a session key $SK_{ij}$ to have, as an input, the input message InputMsg input from the input message collecting unit 1018, using:

$$SK_{ij} = H(3 \| \text{InputMsg})$$

A secret value updater 1028 computes and outputs a (j+1)-th identifier WID and authentication data $v_{i(j+1)}$ to have, as inputs, the identifier WID and authentication data $v_{ij}$ read out from the database 1002, and the input message InputMsg input from the input message collecting unit 1018, using:

$$WID = H1(WID \| \text{InputMsg})$$

$$v_{i(j+1)} = v_{ij} + H_1(\text{InputMsg}) \bmod q$$

The server authentication apparatus 1000 rewrites [WID, $v_{ij}$] as the set of the current identifier WID and authentication data held in the database 1002 by [WID, $v_{i(j+1)}$] as a set of the next identifier WID and authentication data output from the secret value updater 1028.

[3. First Modification of Authentication System 500']

As in the authentication system 100 according to the first embodiment, in the authentication system 500' according to the third embodiment, the computation method of the value Y in the mask calculator 1016 of the server authentication apparatus 1000 can be modified as follows. In this modification, the first and second blinds are computed as follows:

First blind: $T^{y \cdot v_{ij}}$

Second blind: $U^{y \cdot r}$ (for $r = H_2(C \| S_i \| U)$)

That is, in the first example, r is used in the power computations associated with the public value T. However, in this modification, r is used in the power computations associated with the public value U. Then, the value Y obtained by the mask calculator 1016 is computed as follows:

$$Y = U^{y \cdot r} \cdot T^{y \cdot v_{ij}}$$

With these modifications, the computation formula of the blind b in the blind generator 914 in the user terminal 900 is modified as follows:

$$b = u \times r + t \times v_{ij} \bmod q \; (\text{for } r = H_2(C \| S_i \| U))$$

That is, in the first example, r is multiplied by the term associated with the combined value $v_{ij}$. However, in this modification, r is multiplied by the random number u.

[4. Second Modification of Authentication System 500']

In the authentication system 500' according to the third embodiment, the computation method of the value Y in the mask calculator 1016 of the server authentication apparatus 1000 can be modified as follows. In this modification, the first and second blinds are computed as follows:

First blind: $T^{y \cdot r}$ (for $r = H_2(C \| S_i \| U \| v_{ij})$)

Second blind: $U^y$

That is, in the first example, r is computed by $r = H_2(C \| S_i \| U)$. However, in this modification, r is computed by $r = H_2(C \| S_1 \| U \| v_{ij})$. Then, the value Y obtained by the mask calculator 1016 is computed as follows:

$$Y = U^y \cdot T^{y \cdot r}$$

With these modifications, the computation formula of the blind b in the blind generator 914 in the user terminal 900 is modified as follows:

$$b = u + t \times r \bmod q (\text{for } r = H_2(C \| S_i \| U \| v_{ij}))$$

That is, in the first example, r is computed by $r = H_2(C \| S_i \| U)$. However, in this modification, r is computed by $r = H_2(C \| S_i \| U \| v_{ij})$.

[5. Online Dictionary Attack Detection Function of Authentication System 500']

A function of detecting a password online attack of an attacker in the authentication system 500' according to the third embodiment will be described below.

In addition to the aforementioned initialization processing of the authentication system 500', the user terminal 900 sends a key MacK used to generate a MAC (Message Authentication Code) to the server authentication apparatus 1000 via a secure communication channel. The user terminal 900 saves the key MacK together with another recorded information in the internal memory 902. The server authentication apparatus 1000 saves the key MacK received from the user terminal 900 together with another recorded information in the internal memory or database 1002.

In addition to the aforementioned j-th protocol execution processing of the authentication system 500', the user terminal 900 generates a MAC using the key MacK read out from the internal memory 902 for a message to be sent to the server authentication apparatus 1000, and sends the MAC to the server authentication apparatus 1000 together with the message. Likewise, the server authentication apparatus 1000 generates a MAC using the key MacK read out from the internal memory or database 1002 for a message to be sent to the user terminal 900, and sends the MAC to the user terminal 900 together with the message. In the j-th protocol execution processing of the authentication system 500', when the processing is interrupted due to occurrence of an arbitrary error (for example, when the MAC verification has failed), each of the user terminal 900 and server authentication apparatus 1000 saves a message received at that time and other pieces of information (for example, a time, IP address, etc.) in its own memory or database as a log.

When the user terminal 900 and server authentication apparatus 1000 authenticate with each other and share a session key after completion of the j-th protocol of the authentication system 500', the server authentication apparatus 1000 sends pieces of log information saved so far in the internal memory or database 1002 to the user terminal 900 via a secure communication channel protected by the session key, and deletes these pieces of log information. The user terminal 900 displays the number of times of online dictionary attacks associated with a password by an attacker to the user by comparing the pieces of log information received from the server authentication apparatus 1000 and those saved so far in the internal memory 902. The user terminal 900 deletes the pieces of log information saved so far in the internal memory 902.

The online dictionary attack detection function of the authentication system 500' may use a Digital Signature in place of the MAC.

Fourth Embodiment

Still Another Application Example of System of First Embodiment

Figure 13:
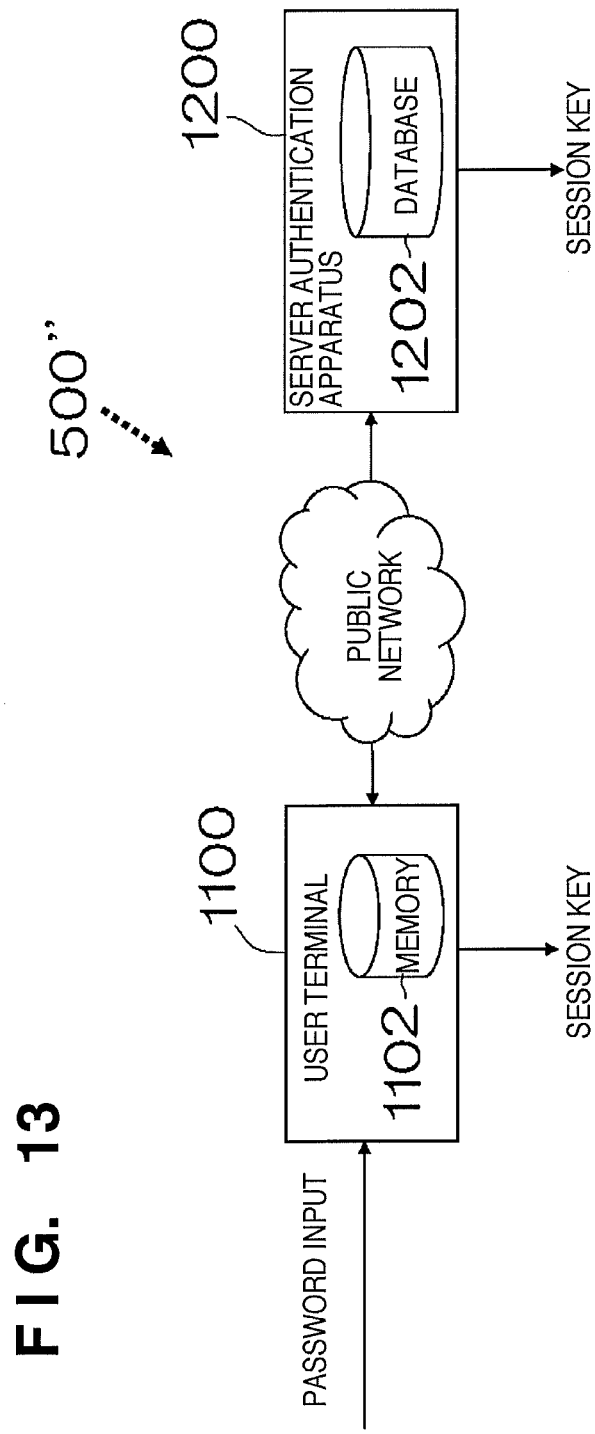
FIG. 13 is a diagram for explaining an overview of the fourth embodiment.

Still another example in which the authentication method using only a password introduced in the first embodiment is applied to a two-factor authentication method will be described below. FIG. 13 depicts the overall arrangement of an authentication system 500" used as an example for explaining this application example.

The authentication system 500" is configured by a user terminal 1100 and server authentication apparatus 1200. In the authentication system 500", the user terminal 1100 makes certain characteristic operations based on recorded information held in, for example, a memory 1102 in addition to a password input by the user. The server authentication apparatus 1200 holds a hashed temporary ID and authentication data in, for example, a database 1202. The terminal 1100 and server authentication apparatus 1200 mutually authenticate with each other via a public network such as the Internet, and only when the mutual authentication has succeeded, they assure the same session key, and update the self recorded information for the next session. Then, the server authentication apparatus 1200 can no longer conduct an exhaustive search of a password for user's authentication data, and the security of the user terminal 1100 never drops even when recorded information leaks.

[1. Initialization of Authentication System 500"]

Figure 14:
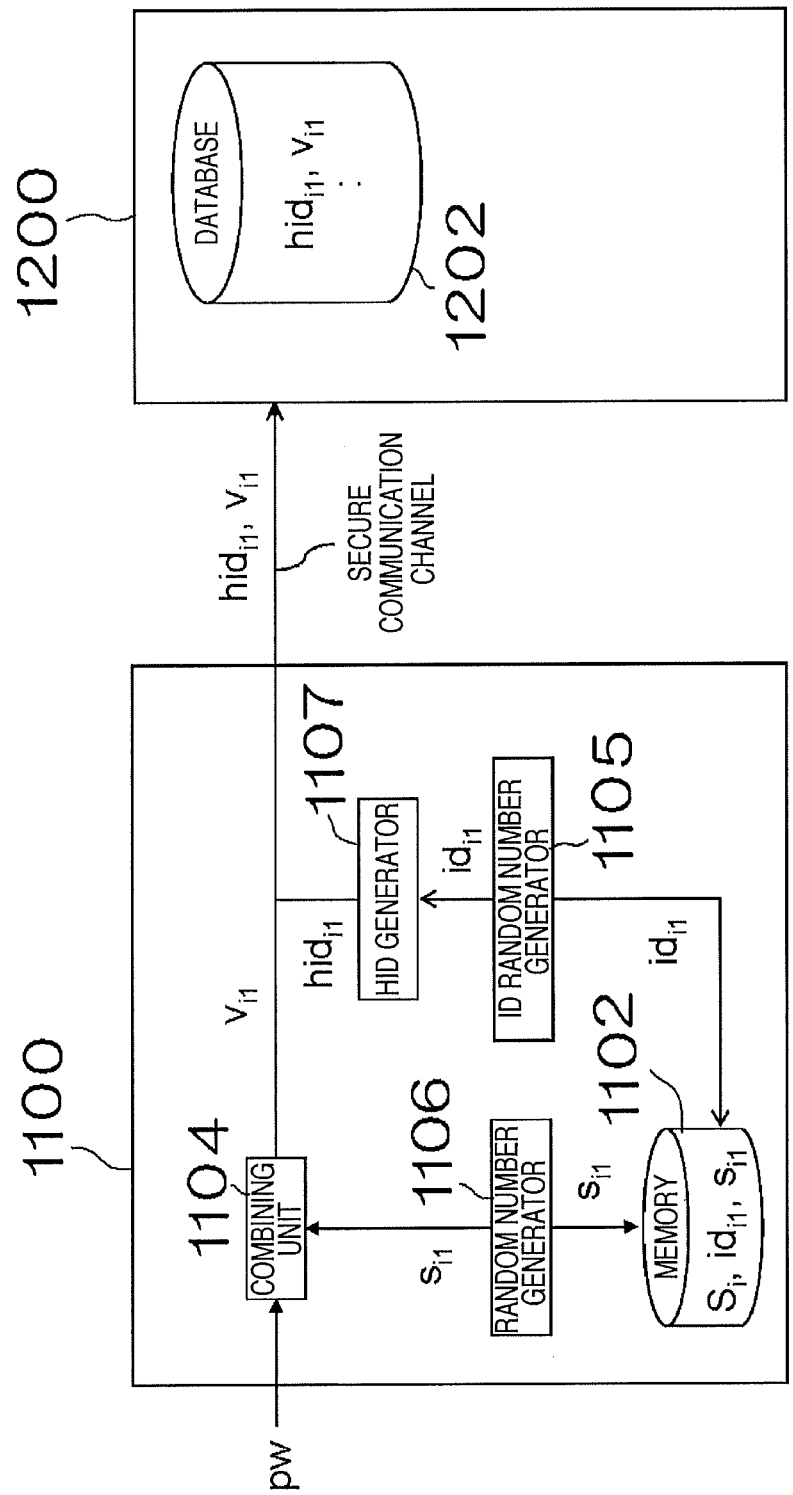
FIG. 14 is a block diagram for explaining an initialization stage in the fourth embodiment.

First, initialization processing in the authentication system 500" will be described below with reference to FIG. 14. FIG. 14 is a block diagram for explaining the functional arrangements and operations of the user terminal 1100 and server authentication apparatus 1200 in association with the initialization processing of the authentication system 500". In the initialization processing of the authentication system 500", the user terminal 1100 executes initialization processing using a secure communication channel (for example, direct registration, mailing, or information using a telephone) with the server authentication apparatus 1200 based on a password input by the user. The user terminal 1100 saves CS1 as recorded information in the internal memory 1102, and the server authentication apparatus 1200 saves SS1 as recorded information in its internal memory or the database 1202.

<Process in User Terminal 1100>

As shown in FIG. 14, in the initialization processing in the user terminal 1100, a combining unit 1104 computes and outputs a combined value $v_{i1}$ to have, as inputs, a password pw input from the user and a random number $s_{i1}$ ($s_{i1} \in (Z/qZ)^*$) which is randomly generated by a random number generator 1106, using:

$$v_{i1} = s_{i1} + H_1(C\|S_i\|pw) \bmod q$$

where $S_i$ indicates the i-th server. An HID generator 1107 computes and outputs an HID value $hid_{i1}$ to have, as an input, an ID value $id_{i1}$ ($id_{i1} \in \{0,1\}^k$) which is randomly generated by an ID random number generator 1105, using:

$$hid_{i1} = H(4\|id_{i1})$$

Then, the HID generator 1107 sends $[hid_{i1}, v_{i1}]$, that is, the HID value and authentication data to the server authentication apparatus 1200. The user terminal 1100 saves $[S_i, id_{i1}, s_{i1}]$, that is, the server ID, the ID value generated by the ID random number generator 1105, and the random number $s_{i1}$ generated by the random number generator 1106 in its internal memory 1102 as recorded information [CS1].

<Process in Server Authentication Apparatus 1200>

As shown in FIG. 14, in the initialization processing in the server authentication apparatus 1200, the server authentication apparatus 1200 saves $[hid_{i1}, v_{i1}]$, that is, the HID value and authentication data received from the user terminal 1100 in its internal memory or the database 1202 as recorded information [SS1].

[2. j-th Protocol Execution of Authentication System 500"]

Figure 15:
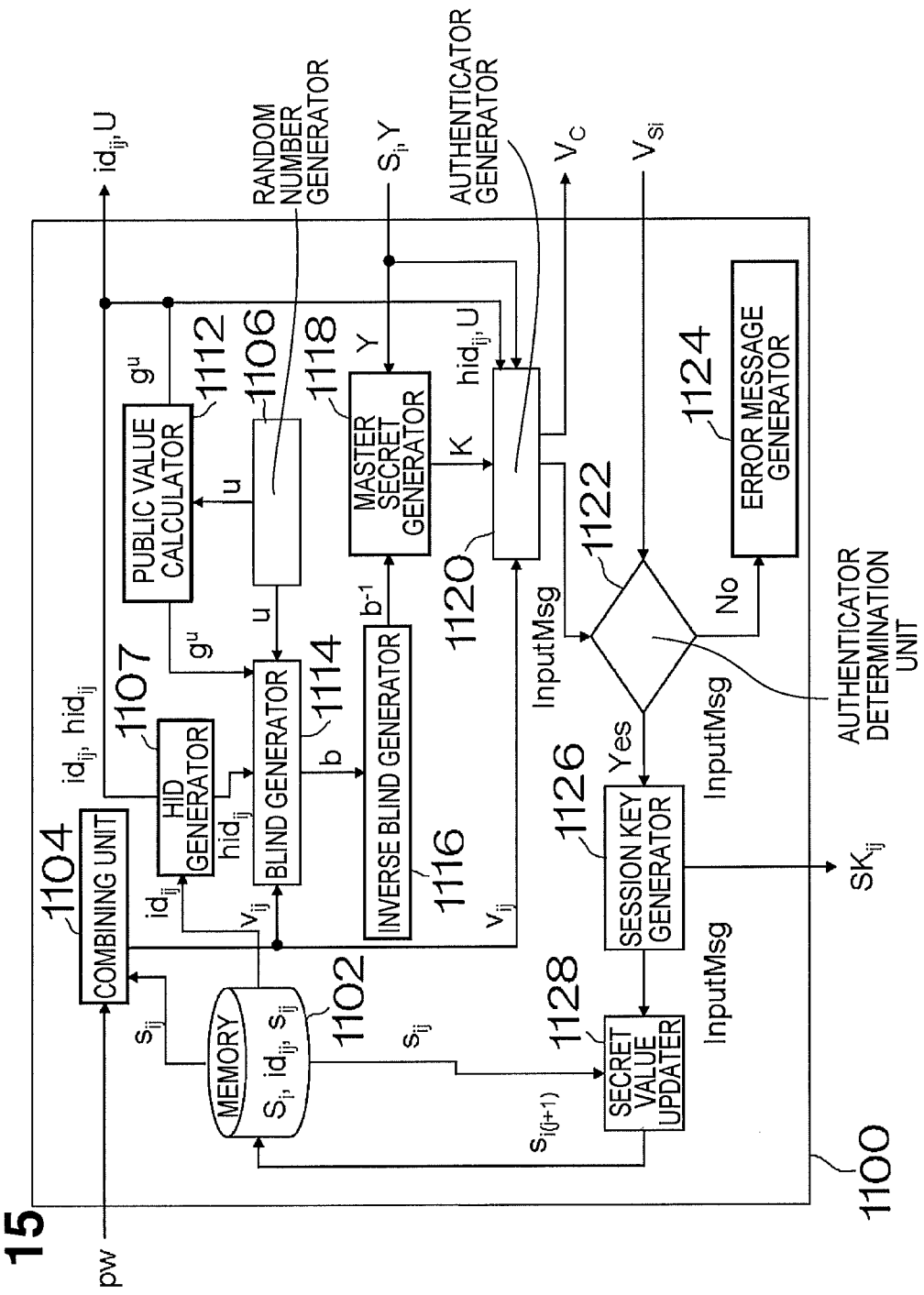
FIG. 15 is a block diagram for explaining the arrangement and functions of a client according to the fourth embodiment.
Figure 16:
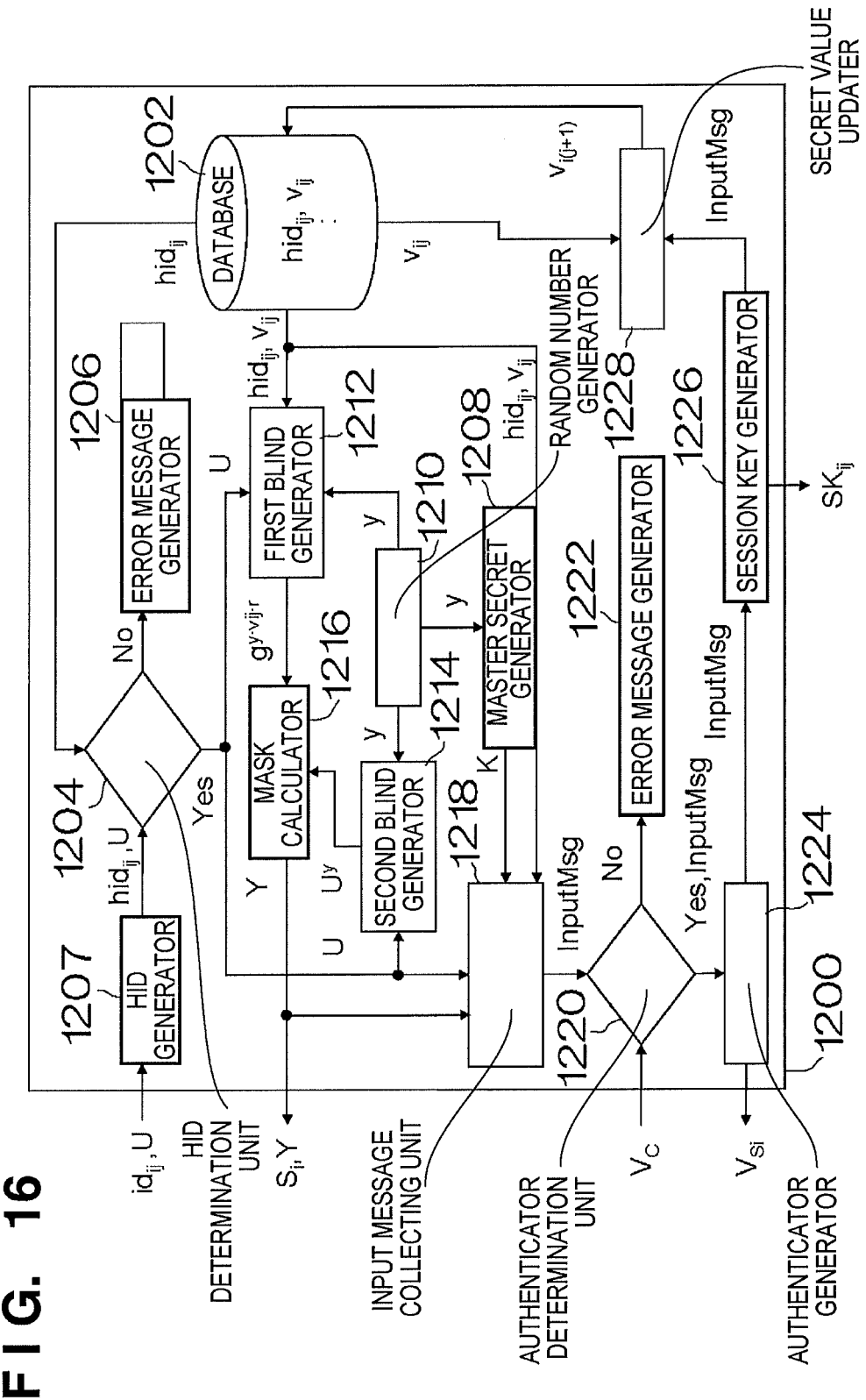
FIG. 16 is a block diagram for explaining the arrangement and functions of a server according to the fourth embodiment.

The j-th protocol execution processing in the authentication system 500" will be described below with reference to FIGS. 15 and 16. FIGS. 15 and 16 are block diagrams for respectively explaining the functional arrangements and operations of the user terminal 1100 and server authentication apparatus 1200, which execute the j-th protocol execution processing of the authentication system 500". In FIGS. 15 and 16, j is an integer which satisfies j≧1. In the j-th protocol execution processing of the authentication system 500", the user terminal 1100 makes certain characteristic operations using the password pw input from the user and recorded information CSj held in the memory 1102. Then, the user terminal 1100 mutually authenticates with the server authentication apparatus 1200 which holds recorded information SSj in, for example, a database via the public network such as the Internet. Only when the mutual authentication has succeeded, the user terminal 1100 and server authentication apparatus 1200 assure the same session key. The j-th protocol execution processing to be described below is executed by the user terminal 1100 and server authentication apparatus 1200 after initialization of the authentication system 500" is complete (when j=1) or after the (j−1)-th protocol execution processing of the authentication system 500" ends (that is, when $CSj=(S_i, id_{ij}, s_{ij})$ and $SSj=(hid_{ij}, v_{ij})$).

<Process in User Terminal 1100>

The j-th protocol execution processing of the authentication system 500" in the user terminal 1100 will be described first with reference to FIG. 15. After the aforementioned initialization processing of the authentication system 500", prior to the j-th protocol execution processing of the authentication system 500", the user terminal 1100 holds, in advance, $[S_i, id_{ij}, s_{ij}]$ as the recorded information [CSj] in its internal memory 1102.

The combining unit 1104 computes and outputs a combined value $v_{ij}$ to have, as inputs, the password pw input from the user and the random number $s_{ij}$ read out from the memory 1102, using:

$$v_{ij}=s_{ij}+H_1(C\|S_i\|pw) \bmod q$$

A public value calculator 1112 computes and outputs a public value U to have, as an input, a random number u ($u \in (Z/qZ)^*$) which is randomly generated by the random number generator 1106, using:

$$U=g^u$$

The HID generator 1107 computes and outputs an HID value to have, as an input, the ID value $id_{ij}$ read out from the memory 1102, using:

$$hid_{ij}=H(4\|id_{ij})$$

A blind generator 1114 computes and outputs a blind b to have, as inputs, the combined value $v_{ij}$ output from the combining unit 1104, the random number u randomly generated by the random number generator 1106, the HID value $hid_{ij}$ output from the HID generator 1107, and the public value U output from the public value calculator 1112, using:

$$b=u+v_{ij} \times r \bmod q$$

wherein r is given by:

$$r=H_2(hid_{ij}\|S_i\|U)$$

An inverse blind calculator 1116 computes and outputs an inverse blind $b^{-1}$ to have, as an input, the blind b output from the blind generator 1114, using:

$$b^{-1} \bmod q$$

The user terminal 1100 sends the ID value $id_{ij}$ read out from the memory 1102 and the public value U output from the public value calculator 1112 to the server authentication apparatus 1200 via a communication processor (not shown).

After a short time, the user terminal 1100 receives a message $[S_i, Y]$ from the server authentication apparatus 1200. A master secret generator 1118 computes and outputs a master secret K to have, as inputs, a value Y received from the server authentication apparatus 1200 and the inverse blind $b^{-1}$ output from the inverse blind calculator 1116, using:

$$K=Y^{(1/b \bmod q)}$$

Subsequently, an authenticator generator 1120 computes an authenticator Vc to have, as inputs, the HID value $hid_{ij}$ output from the HID generator 1107, the public value U output from the public value calculator 1112, the value Y received from the server authentication apparatus 1200, the combined value $v_{ij}$ output from the combining unit 1104, and the master secret K output from the master secret generator 1118, using:

$$Vc=H(1\|hid_{ij}\|S_i\|U\|Y\|v_{ij}\|K)$$

The authenticator generator 1120 then outputs the authenticator Vc together with an input message InputMsg. Note that the input message is described as:

$$InputMsg=hid_{ij}\|S_i\|U\|Y\|v_{ij}\|K$$

In this case, a MAC (Message Authentication Code) may be used in place of the hash function H. The user terminal 1100 sends the authenticator Vc output from the authenticator generator 1120 to the server authentication apparatus 1200 via a communication processor (not shown).

After a short time, the user terminal 1100 receives a message $[V_{Si}]$ from the server authentication apparatus 1200. An authenticator determination unit 1122 confirms if an authenticator $V_{Si}$ received from the server authentication apparatus 1200 is a correctly generated value. The authenticator determination unit 1122 compares a hash function $H(2\|InputMsg)$ with the authenticator $V_{Si}$ received from the server authentication apparatus 1200 based on the input message InputMsg input from the authenticator generator 1120. In this comparison processing, when the authenticator $V_{Si}$ and the hash function $H(2\|InputMsg)$ do not match, the authenticator determination unit 1122 notifies an error message generator 1124 of the mismatch. In response to this notification, the error message generator 1124 generates an error message, and interrupts the processing.

On the other hand, when it is determined in the determination processing of the authenticator determination that the authenticator $V_{Si}$ and hash function $H(2\|InputMsg)$ match, the server authentication apparatus 1200 is authenticated as an authentic apparatus to proceed with the next processing. A session key generator 1126 computes and outputs a session key $SK_{ij}$ to have, as an input, the input message InputMsg input from the authenticator generator 1120, using:

$$SK_{ij}=H(3\|InputMsg)$$

A secret value updater 1128 computes and outputs a (j+1)-th random number $s_{i(j+1)}$ to have, as inputs, the random number $s_{ij}$ read out from the memory 1102 and the input message InputMsg input from the authenticator generator 1120, using:

$$s_{i(j+1)}=s_{ij}+H_1(InputMsg) \bmod q$$

The user terminal 1100 rewrites $[s_{ij}]$ as the current random number held in the memory 1102 by $[s_{i(j+1)}]$ as the next random number output from the secret value updater 1128.

<Process in Server Authentication Apparatus 1200>

The j-th protocol execution processing of the authentication system 500" in the server authentication apparatus 1200 will be described below with reference to FIG. 16. After the aforementioned initialization processing of the authentication system 500", prior to the j-th protocol execution processing of the authentication system 500", the server authentication apparatus 1200 holds $[hid_{ij}, v_{ij}]$ as recorded information [SSj] in a memory included in a storage device or the database 1202.

The server authentication apparatus 1200 receives a message $[id_{ij}, U]$ from the user terminal 1100. An HID generator 1207 computes and outputs an HID value $hid_{ij}$ to have, as an input, an ID value $id_{ij}$ received from the user terminal 1100, using:

$$hid_{ij}=H(4\|id_{ij})$$

When the HID value $hid_{ij}$ read out from the database is compared with the HID value output from the HID generator 1207, and when they do not match, an HID determination unit 1204 notifies an error message generator 1206 of the mismatch. In response to this notification, the error message generator 1206 generates an error message, and interrupts the processing. On the other hand, in the determination processing of the HID determination unit 1204, when the HID value $hid_{ij}$ read out from the database is compared with the HID value $hid_{ij}$ output from the HID generator 1207, and when they match, the next processing is proceeded.

A master secret generator 1208 computes and outputs a master secret K to have, as an input, a random number y (y∈(Z/qZ)*) which is randomly generated by a random number generator 1210, using:

$$K=g^y$$

A first blind generator 1212 computes and outputs a first blind $g^{y \cdot v_{ij} \cdot r}$ to have, as inputs, the public value U received from the user terminal 1100, the HID value $hid_{ij}$ and authentication data $v_{ij}$ read out from the database, and the random number y randomly generated by the random number generator 1210, using:

$$g^{y \cdot v_{ij} \cdot r}$$

where r is given by:

$$r=H_2(hid_{ij}\|S_i\|U)$$

A second blind generator 1214 computes and outputs a second blind $U^y$ to have, as inputs, the public value U received from the user terminal 1100 and the random number y randomly generated by the random number generator 1210, using:

$$U^y$$

A mask calculator 1216 computes and outputs a value Y to have, as inputs, the first blind $g^{y \cdot v_{ij} \cdot r}$ output from the first blind generator 1212 and the second blind $U^y$ output from the second blind generator 1214, using:

$$Y=U^y \cdot g^{y \cdot v_{ij} \cdot r}$$

The server authentication apparatus 1200 sends $S_i$ as a server ID and the value Y output from the mask calculator 1216 to the user terminal 1100 via a communication processor (not shown).

Subsequently, an input message collecting unit 1218 outputs an input message InputMsg to have, as inputs, the public value U received from the user terminal 1100, the value Y output from the mask calculator 1216, the HID value $hid_{ij}$ and authentication data $v_{ij}$ read out from the database, and the master secret K output from the master secret generator 1208. In this case, the input message InputMsg is described as:

$$InputMsg=hid_{ij}\|S_i\|U\|Y\|v_{ij}\|K$$

After a short time, the server authentication apparatus 1200 receives a message [Vc] from the user terminal 1100.

An authenticator determination unit 1220 confirms if an authenticator Vc received from the user terminal 1100 is a correctly generated value. The authenticator determination unit 1220 executes comparison processing between the authenticator Vc received from the user terminal 1100 and a hash function H(1∥InputMsg) based on the input message InputMsg input from the input message collecting unit 1218. In this comparison processing, when the authenticator Vc does not match the hash function H(1∥InputMsg), the authenticator determination unit 1220 notifies an error message generator 1222 of the mismatch. In response to this notification, the error message generator 1222 generates an error message, and interrupts the processing. On the other hand, when it is determined in the comparison processing that the authenticator Vc matches the hash function H(1∥InputMsg), since the user terminal 1100 is authenticated as an authentic apparatus, the next processing is proceeded. Note that a MAC (Message Authentication Code) may be used in place of the hash function H in this case.

An authenticator generator 1224 computes and outputs an authenticator $V_{Si}$ to have, as an input, the input message InputMsg input from the input message collecting unit 1218, using:

$$V_{Si}=H(2\|InputMsg)$$

The server authentication apparatus 1200 sends the authenticator $V_{Si}$ output from the authenticator generator 1224 to the user terminal 1100 via a communication processor (not shown).

A session key generator 1226 computes and outputs a session key $SK_{ij}$ to have, as an input, the input message InputMsg input from the input message collecting unit 1218, using:

$$SK_{ij}=H(3\|InputMsg)$$

A secret value updater 1228 computes and outputs (j+1)-th authentication data $v_{i(j+1)}$ to have, as inputs, the authentication data $v_{ij}$ read out from the database 1202, and the input message InputMsg input from the input message collecting unit 1218, using:

$$v_{i(j+1)}=v_{ij}+H_1(InputMsg) \bmod q$$

The server authentication apparatus 1200 rewrites [$v_{ij}$] as the current authentication data held in the database 1202 by [$v_{i(j+1)}$] as the next authentication data output from the secret value updater 1228.

[3. After Completion of j-th Protocol of Authentication System 500"]

Processing after completion of the j-th protocol in the authentication system 500" will be described below with reference to FIG. 17. FIG. 17 is a block diagram for explaining the functional arrangements and operations of the user terminal 1100 and server authentication apparatus 1200, which are associated with the processing after completion of the j-th protocol of the authentication server 500". In the processing after completion of the j-th protocol of the authentication server 500", the user terminal 1100 securely sends, to the server authentication apparatus 1200, an HID value $hid_{i(j+1)}$ for the next session using the session key $SK_{ij}$ output from the session key generator 1126. The user terminal 1100 saves $id_{i(j+1)}$ as the next ID value in the internal memory 1102, and the server authentication apparatus 1200 saves $hid_{i(j+1)}$ as the next HID value in the internal memory or database 1202.

<Process in User Terminal 1100>

As shown in FIG. 17, in the processing after completion of the j-th protocol of the user terminal 1100, the HID generator 1107 computes and outputs a (j+1)-th HID value $hid_{i(j+1)}$ to have, as an input, an ID value $id_{i(j+1)}$ ($id_{i(j+1)} \in \{0,1\}^k$) which is randomly generated by the ID random number generator 1105, using $$hid_{i(j+1)}=H(4\|id_{i(j+1)})$$

Then, the HID generator 1107 sends the HID value [$hid_{i(j+1)}$] to the server authentication apparatus 1200. The user terminal 1100 rewrites [$id_{ij}$] as the current ID value held in the internal memory 1102 by [$id_{i(j+1)}$] as the next ID value generated by the ID random number generator 1105.

<Process in Server Authentication Apparatus 1200>

As shown in FIG. 17, in the processing after completion of the j-th protocol of the server authentication apparatus 1200, the server authentication apparatus 1200 rewrites [$hid_{ij}$] as the current HID value held in the internal memory or database 1202 by [$hid_{i(j+1)}$] as the (j+1)-th HID value received from the user terminal 1100.

[4. Modification of Authentication System 500"]

As in the authentication system 100 according to the first embodiment, in the authentication system 500" according to the fourth embodiment, the computation method of the value Y in the mask calculator 1216 of the server authentication apparatus 1200 can be modified as follows. In this modification, the first and second blinds are computed as follows:

First blind: $g^{y \cdot v_{ij}}$

Second blind: $U^{y \cdot r}$ (for $r=H_2(hid_{ij}\|S_i\|U)$)

That is, in the first example, r is used in the power computations associated with g. However, in this modification, r is used in the power computations associated with the public value U. Then, the value Y obtained by the mask calculator 1216 is computed as follows:

$$Y=U^{y \cdot r} \cdot g^{y \cdot v_{ij}}$$

With these modifications, the computation formula of the blind b in the blind generator 1114 in the user terminal 1100 is modified as follows:

$$b=u \times r + v_{ij} \bmod q \text{(for } r=H_2(hid_{ij}\|S_i\|U))$$

That is, in the first example, r is multiplied by the term associated with the combined value $v_{ij}$. However, in this modification, r is multiplied by the random number u.

[5. Online Dictionary Attack Detection Function of Authentication System 500"]

A function of detecting a password online attack of an attacker in the authentication system 500" according to the fourth embodiment will be described below.

In addition to the aforementioned initialization processing of the authentication system 500", the user terminal 1100 sends a key MacK used to generate a MAC (Message Authentication Code) to the server authentication apparatus 1200 via a secure communication channel. The user terminal 1100 saves the key MacK together with another recorded information in the internal memory 1102. The server authentication apparatus 1200 saves the key MacK received from the user terminal 1100 together with another recorded information in the internal memory or database 1202.

In addition to the aforementioned j-th protocol execution processing of the authentication system 500", the user terminal 1100 generates a MAC using the key MacK read out from the internal memory 1102 for a message to be sent to the server authentication apparatus 1200, and sends the MAC to the server authentication apparatus 1200 together with the message. Likewise, the server authentication apparatus 1200 generates a MAC using the key MacK read out from the internal memory or database 1202 for a message to be sent to the user terminal 1100, and sends the MAC to the user terminal 1100 together with the message. In the j-th protocol execution processing of the authentication system 500", when the processing is interrupted due to occurrence of an arbitrary error (for example, when the MAC verification has failed), each of the user terminal 1100 and server authentication apparatus 1200 saves a message received at that time and other pieces of information (for example, a time, IP address, etc.) in its own memory or database as a log.

In addition to the aforementioned processing after completion of the j-th protocol of the authentication system 500", when the user terminal 1100 and server authentication apparatus 1200 authenticate with each other and share a session key, the server authentication apparatus 1200 sends pieces of log information saved so far in the internal memory or database 1202 to the user terminal 1100 via a secure communication channel protected by the session key, and deletes these pieces of log information. The user terminal 1100 displays the number of times of online dictionary attacks associated with a password by an attacker to the user by comparing the pieces of log information received from the server authentication apparatus 1200 and those saved so far in the internal memory 1102. The user terminal 1100 deletes the pieces of log information saved so far in the internal memory 1102.

The online dictionary attack detection function of the authentication system 500" may use a Digital Signature in place of the MAC.

Some examples of the practical embodiments of the present invention have been described. However, these examples are not taken for the purpose of limiting practical embodiments of the ideas of the present invention, but they are taken for contribution to deeper understanding of novel technical ideas disclosed by the present invention. Embodiments of the disclosed technical ideas are not limited to the above examples, and various modes can be adopted without departing from these ideas.

REFERENCE SIGNS LIST

100 . . . Authentication system
300 . . . User terminal
302 . . . Password authentication data generator
304 . . . Public value calculator
306 . . . Random number generator
308 . . . Blind generator
310 . . . Inverse blind generator
312 . . . Master secret generator
314 . . . Authenticator generator
316 . . . Authenticator determination unit
318 . . . Error message generator
320 . . . Session key generator
400 . . . Server authentication apparatus
402 . . . Database
404 . . . First blind generator
405 . . . Second blind generator
406 . . . Random number generator
408 . . . Mask calculator
412 . . . Master secret generator
414 . . . Input message collecting unit
416 . . . Authenticator determination unit
418 . . . Error message generator
420 . . . Authenticator generator
422 . . . Session key generator
500 . . . Authentication system
500' . . . Authentication system
500" . . . Authentication system
700 . . . User terminal
702 . . . Memory
704 . . . Combining unit
706 . . . Random number generator
708 . . . Two-factor authentication data generator
712 . . . Public value calculator
714 . . . Blind generator
716 . . . Inverse blind generator
718 . . . Master secret generator
720 . . . Authenticator generator
722 . . . Authenticator determination unit
724 . . . Error message generator
726 . . . Session key generator
728 . . . Secret value updater
800 . . . Server authentication apparatus
802 . . . Database
804 . . . WID determination unit
806 . . . Error message generator 808 ... Master secret generator
810 ... Random number generator
812 ... First blind generator
814 ... Second blind generator
816 ... Mask calculator
818 ... Input message collecting unit
820 ... Authenticator determination unit
822 ... Error message generator
824 ... Authenticator generator
826 ... Session key generator
828 ... Secret value updater
900 ... User terminal
902 ... Memory
904 ... Combining unit
906 ... Random number generator
912 ... Public value calculator
914 ... Blind generator
916 ... Inverse blind generator
918 ... Master secret generator
920 ... Authenticator generator
922 ... Authenticator determination unit
924 ... Error message generator
926 ... Session key generator
928 ... Secret value updater
1000 ... Server authentication apparatus
1002 ... Database
1004 ... WID determination unit
1006 ... Error message generator
1008 ... Master secret generator
1010 ... Random number generator
1012 ... First blind generator
1014 ... Second blind generator
1016 ... Mask calculator
1018 ... Input message collecting unit
1020 ... Authenticator determination unit
1022 ... Error message generator
1024 ... Authenticator generator
1026 ... Session key generator
1028 ... Secret value updater
1100 ... User terminal
1102 ... Memory
1104 ... Combining unit
1105 ... ID random number generator
1106 ... Random number generator
1107 ... HID generator
1112 ... Public value calculator
1114 ... Blind generator
1116 ... Inverse blind generator
1118 ... Master secret generator
1120 ... Authenticator generator
1122 ... Authenticator determination unit
1124 ... Error message generator
1126 ... Session key generator
1128 ... Secret value updater
1200 ... Server authentication apparatus
1202 ... Database
1204 ... HID determination unit
1206 ... Error message generator
1207 ... HID generator
1208 ... Master secret generator
1210 ... Random number generator
1212 ... First blind generator
1214 ... Second blind generator
1216 ... Mask calculator
1218 ... Input message collecting unit
1220 ... Authenticator determination unit
1222 ... Error message generator
1224 ... Authenticator generator
1226 ... Session key generator
1228 ... Secret value updater

The invention claimed is:

1. A mutual authentication method between a client and a server, processing executed by the server comprising:

(a) computing, based on a random number y ($y \in (Z/qZ)^*$) generated by the server, a server-side master secret Ks by:

$$Ks = g^y \qquad (1)$$

(b) receiving first client information U computed by the client from the client together with a first identifier (C, WID, id);

(c) computing, using the received first client information U, the first identifier, and a symbol W that represents a part which includes information associated with a password pw, first server information Y by:

$$Y = U^y \cdot W^{y \cdot r} \qquad (2)$$

or $$Y = U^{y \cdot r} \cdot W^{y} \qquad (2')$$

(d) sending the computed first server information Y to the client;

(e) authenticating client authentication information Vc received from the client using the server-side master secret Ks; and (f) generating server authentication information Vs using the server-side master secret Ks, and sending the Vs to the client, where q is an order of a group (G, ·), g is a generator of that set G, and "·" is a binary operator on G, the symbol W is allowed to be obtained, based on password information v generated by the client, by:

$$W = g^v \qquad (3)$$

or based on the password information v generated by the client and a committed value T of a random number t generated by the client, by:

$$W = T^v = g^{t \times v} \qquad (3')$$

the password information v is a value computed based on an output of a function $H_1(\ )$ which has at least the password pw as an input, x is a multiplication on integers, symbol r in equations (2) and (2') represents a value which is unknown at a time before the client computes the first client information U and a value which is computable by both the server and the client, and U, W, Y, T, g∈G, and processing executed by the client comprising:

(a') computing, based on a random number u ($u \in (Z/qZ)^*$) generated by the client, the first client information U by:

$$U = g^u$$

(b') sending the computed first client information U to the server together with the first identifier;

(c') receiving the first server information Y in response to sending of the first client information U;

(d') when $W = g^v$ ... (3) above, computing, based on the password information v and the value r, a blinded value b using:

$$b = u + v \times r \bmod q \text{ (when } Y = U^y \cdot W^{y \cdot r}) \qquad (4)$$

or $$b = u \times r + v \bmod q \text{ (when } Y = U^{y \cdot r} \cdot W^{y}) \qquad (4')$$

or when $W=T^v=g^{t\times v}$ ... (3') above, computing, based on the password information v generated by the client and the random number t generated by the client, the blinded value b using:

$$b = u + t \times v \times r \bmod q \quad \text{(when } Y = U^{p'} \cdot W^{p'r}) \quad (5)$$

or $$b = u \times r + t \times v \bmod q \quad \text{(when } Y = U^{p'r} \cdot W^{p'}) \quad (5')$$

(e') computing, based on the received first server information Y, a client-side master secret Kc by:

$$K_C = Y^{(1/b \bmod q)}$$

(f') generating client authentication information Vc using the client-side master secret Kc, and sending Vc to the server; and (g') authenticating the server authentication information Vs received from the server using the client-side master secret Kc, where [1/b mod q] indicates an integer a which satisfies [a×b≡1 mod q] and is not less than 1 and is less than q.

2. The method according to claim 1, wherein the value r is a value which is computable from the random number sent from the server to the client after the first client information U is sent from the client, or from an output obtained by using at least the first client information U as an input to a one-way function $F_2(\ )$.

3. The method according to claim 1, wherein the password information v is a value which is computable from an output of a one-way function $F_1(\ )$ having at least the password pw as an input.

4. The method according to claim 1, wherein the password information v is a value obtained by combining at least an output of a function $H_1(\ )$ or a one-way function $F_1(\ )$ at least having the password pw as an input and a random number s, or a value obtained by combining at least the password pw and the random number s.

5. The method according to claim 1, wherein the password information v is describable as:

$$v = s + hpw \bmod q, \text{ or}$$

$$v = s \times hpw \bmod q, \text{ or}$$

$$v = s(+) hpw, \text{ or}$$

a value which is computable from an output of a function $H_1(\ )$ or a one-way function $F_1(\ )$ having at least the password pw and the random number s as inputs, where hpw is a value which is computable from an output of the function $H_1(\ )$ or the one-way function $F_1(\ )$ having at least the password pw as an input, and (+) is an exclusive OR.

6. The method according to claim 1, wherein the part W or the password information v is stored in advance in a storage device of the server in association with the first identifier (C, WID), and the method comprises causing the server to search the storage device based on the received first identifier to retrieve the part W (when the part W is stored) or the password information v (when the password information v is stored).

7. The method according to claim 1, wherein the part W or the password information v is stored in advance in a storage device of the server in association with a second identifier which is computed from an output of a one-way function $H_3(\ )$ which includes at least the first identifier (C, WID) as an input, and the method comprises causing the server to search the storage device based on the second identifier computed from the output of the one-way function $H_3(\ )$ which includes at least the received first identifier (C, WID) as an input to retrieve the part W (when the part W is stored) or the password information v (when the password information v is stored).

8. The method according to claim 1, wherein the client has a client-side alteration detector generation key and a client-side alteration detector verification key, the server has, together with the first identifier or the second identifier, a server-side alteration detector verification key required to verify an alteration detector generated based on the client-side alteration detector generation key, and a server-side alteration detector generation key which is allowed to generate an alteration detector that is allowed to be verified by the client-side alteration detector verification key, and in the client-server mutual authentication, the method comprises:

(a) causing the server to record, when the server receives the U from the client, a set of at least the U and the Y in a log list Ps', to generate an alteration detector mac2 using the server-side alteration detector generation key at least for the U and the Y, and to send the alteration detector mac2 to the client;

(b) causing the client to interrupt, when verification of the alteration detector mac2 sent from the server has failed, the client-server mutual authentication without sending the client authentication information Vc;

(c) causing the client to generate, when verification of the alteration detector mac2 sent from the server has succeeded, an alteration detector mac3 using the client-side alteration detector generation key at least for the Y and the client authentication information Vc, to send the alteration detector to the server, and to record a set of at least the U and the Y in a log list Pc;

(d) causing the server to interrupt, when verification of the alteration detector mac3 sent from the client has failed, the client-server mutual authentication;

(e) causing the server to record, when verification of the alteration detector mac3 sent from the client has succeeded, and when verification of the client information Vc sent from the client has failed, a set of at least the U and the Y in a log list Ps, and to interrupt the client-server mutual authentication; and (f) comparing, when the client-server mutual authentication is normally terminated, sets of at least U and Y in the log lists Ps, Pc, and Ps' which are kept recorded by the server and the client during that client-server mutual authentication processing, after the previous client-server mutual authentication step is normally terminated, by a method which is never altered by a third party.

9. The method according to claim 8, wherein the alteration detector generation key and detector verification key of at least one of the server side and the client side are MAC (Message Authentication Code) keys.

10. The method according to claim 9, wherein when the alteration detector generation key and detector verification key of both the server side and the client side are MAC (Message Authentication Code) keys, all of the server-side alteration detector generation key, the server-side alteration detector verification key, the client-side alteration detector generation key, and the client-side alteration detector verification key are identical keys, and the client and the server use different MAC generation algorithms or different message formats so as to allow to generate different alteration detectors when the client and the server use identical MAC keys.

11. The method according to claim 8, wherein the alteration detector generation key is used as a digital signature generation key, and the detector verification key is used as a digital signature verification key.

12. The method according to claim 1, wherein the client has a client-side data key cdk, the server has a server-side data key sdk together with the first identifier or second identifier, and the method comprises, when a client-server mutual authentication step is normally terminated:

(a) causing the server to send, to the client, the server-side data key sdk, which is encrypted using an encryption key generated depending on the server-side master secret Ks generated in that client-server mutual authentication step;

(b) causing the client to decrypt the encrypted data key sdk sent from the server using an encryption key generated depending on the client-side master secret Kc generated in that client-server mutual authentication step; and (c) causing the client to restore data key dk from the client-side data key cdk and the server-side data key sdk.

13. The method according to claim 1, wherein the client has a client-side data key cdk, the server has a server-side data key sdk together with the first identifier or second identifier, and the method comprises, when a client-server mutual authentication step is normally terminated:

(a') causing the client to send, to the server, the client-side data key cdk, which is encrypted using an encryption key generated depending on the client-side master secret Kc generated in that client-server mutual authentication step;

(b') causing the server to decrypt the encrypted client-side data key cdk sent from the client using an encryption key generated depending on the server-side master secret Ks generated in that client-server mutual authentication step; and (c') causing the server to restore data key dk from the client-side data key cdk and the server-side data key sdk.

14. The method according to claim 12, wherein the data key dk is given by:

data key dk is given by:

$dk'=cdk(+)sdk$, or $dk'=cdk+sdk \bmod q$, or $dk'=cdk \times sdk \bmod q$, and is allowed to be restored by:

$dk=dk'$, or $dk=(dk')(+)hpw$, or $dk=(dk')+hpw \bmod q$, or $dk=(dk') \times hpw \bmod q$, or a value computed from an output of a function $H_3()$ having at least dk' and hpw as inputs, where (dk') indicates computing a value dk' for the first time, hpw is a value which is computable from an output of a function $H_1()$ or a one-way function $F_1()$ having at least the password pw as an input, and (+) is an exclusive OR.

15. The method according to claim 1, wherein the client saves one or both of the random number t and the first identifier as pieces of information which are likely to be used by the client to attain the client-server mutual authentication in advance in a recording device of the client, and when the client executes the client-server mutual authentication, the client reads out the saved information in response to a request of the client-server mutual authentication.

16. The method according to claim 1, wherein the method comprises updating, when the client-server mutual authentication has succeeded, all or some of the first identifier, the part W or the password information v, and a committed value T of a random number t generated by the client, as pieces of information which are used in that mutual authentication and are recorded in the storage device of the server, and both or one of the random number t and the first identifier, as pieces of information recorded in the storage device of the client, using values exchanged between the client and the server, or the master secrets Kc (client side) and Ks (server side) shared in that authentication step, or both the master secrets and the values exchanged between the server and the client.

17. The method according to claim 16, wherein the password information v is computable, based on the password pw and a random number s, by:

$v=s+hpw \bmod q$ or $v=s \times hpw \bmod q$ in the updating, the server updates the part W to W' to be describable as:

$W'=W \cdot g^{ud}$ or $W'=W^{ud}$ and, the client updates the random number s to s' to be describable as:

$s'=s+ud \bmod q$ or $s'=s \times ud \bmod q$ where hpw is an output of a function $H_1()$ or a one-way function $F_1()$ having at least the password pw as an input, and ud is a value generated from the master secrets Ks (server side) and Kc (client side) shared by the server and the client.

18. The method according to claim 16, wherein the password information v is computable, based on the password pw and a random number s, by:

$v=s+hpw \bmod q$ in the updating, the server updates the password information v to v' to be describable as:

$v'=v+ud \bmod q$ and, the client updates the random number s to s' to be describable as:

$s'=s+ud \bmod q$ where hpw is an output of a function $H_1()$ or a one-way function $F_1()$ having at least the password pw as an input, and ud is a value generated from the master secrets Ks (server side) and Kc (client side) shared by the server and the client.

19. The method according to claim 16, wherein the password information v is computable, based on the password pw and random number s, by:

$v=s(+)hpw$ in the updating, the server updates the password information v to v' to be describable as:

$$v'=v(+)ud$$

and, the client updates the random number s to s' to be describable as:

$$s'=s(+)ud$$

where hpw is an output of a function $H_1(\ )$ or a one-way function $F_1(\ )$ having at least the password pw as an input, ud is a value generated from the master secrets Ks (server side) and Kc (client side) shared by the server and the client, and (+) is an exclusive OR.

20. The method according to claim 16, wherein the password information v is computable, based on the password pw and a random number s, by:

$$v=s \times hpw \bmod q$$

in the updating, the server updates the password information v to v' to be describable as:

$$v'=v \times ud \bmod q$$

and, the client updates the random number s to s' to be describable as:

$$s'=s \times ud \bmod q$$

where hpw is an output of a function $H_1(\ )$ or a one-way function $F_1(\ )$ having at least the password pw as an input, and ud is a value generated from the master secrets Ks (server side) and Kc (client side) shared by the server and the client.

21. The method according to claim 10, wherein the method comprises updating, when the client-server mutual authentication has succeeded,
both or one of the server-side alteration detector generation key and the server-side alteration detector verification key as pieces of information which are used in that mutual authentication and are recorded in the storage device of the server, and
both or one of the client-side alteration detector generation key and the client-side alteration detector verification key as pieces of information recorded in the storage device of the client
using values exchanged between the client and the server, or the master secrets Kc (client side) and Ks (server side) shared by that authentication processing, or both the master secrets and the values exchanged between the server and the client, and
when the server and the client use the same MAC key MacK, causing the server and the client to respectively update the MAC key MacK to MacK' is describable as:

$$MacK'=MacK(+)ud, \text{ or}$$

$$MacK'=MacK+ud \bmod q, \text{ or}$$

$$MacK'=MacK \times ud \bmod q$$

where ud is a value generated from the master secret Ks (server side) and Kc (client side) shared by the server and the client.

22. The method according to claim 14, wherein the method comprises updating, when the client-server mutual authentication has succeeded,
the server-side data key sdk as information which is used in that mutual authentication and is recorded in the storage device of the server, and
the client-side data key cdk as information recorded in the storage device of the client
using values exchanged between the client and the server, or the master secrets Kc (client side) and Ks (server side) shared in that authentication processing, or both the master secrets and the values exchanged between the server and the client, and
when the client has the client-side data key cdk and the server has the server-side data key sdk, causing the server and the client to respectively update cdk and sdk to cdk' and sdk' is describable,
when the dk' is describable as $$dk'=cdk(+)sdk$$

by $$cdk'=cdk(+)ud$$

$$sdk'=sdk(+)ud,$$

when the dk' is describable as $$dk'=cdk+sdk \bmod q$$

by $$cdk'=cdk+ud \bmod q$$

$$sdk'=sdk-ud \bmod q$$

or $$cdk'=cdk-ud \bmod q$$

$$sdk'=sdk+ud \bmod q,$$

or when the dk' is describable as $$dk'=cdk \times sdk \bmod q$$

by $$cdk'=cdk \times ud \bmod q$$

$$sdk'=sdk/ud \bmod q$$

or $$cdk'=cdk/ud \bmod q$$

$$sdk'=sdk \times ud \bmod q$$

where ud is a value generated from the master secrets Ks (server side) and Kc (client side) shared by the server and the client, —is a subtraction on integers, and [a=c/b mod q] indicates an integer a which is not less than 1 and is less than q, and satisfies [a×b≡c mod q] when c≠0.

23. A system including a client and server, configured so that the client and the server execute a mutual authentication method according to claim 1.

24. A computer which is configured to carry out processing executed on a client side in a mutual authentication method according to claim 1.

25. A computer which is configured to carry out processing executed on a server side in a mutual authentication method according to claim 1.

26. A computer program embodied on a non-transitory computer readable medium which is executed by a CPU of a computer to control the computer to carry out processing executed on a client side in a mutual authentication method according to claim 1.

27. A computer program embodied on a non-transitory computer readable medium which is executed by a CPU of a computer to control the computer to carry out processing executed on a server side in a mutual authentication method according to claim 1.

* * * * *